US008216727B2

(12) United States Patent
Yamashita et al.

(10) Patent No.: US 8,216,727 B2
(45) Date of Patent: *Jul. 10, 2012

(54) AROMATIC HYDROCARBON BASED PROTON EXCHANGE MEMBRANE AND DIRECT METHANOL FUEL CELL USING SAME

(75) Inventors: Masahiro Yamashita, Otsu (JP); Yoshimitsu Sakaguchi, Otsu (JP); Kota Kitamura, Otsu (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 904 days.

This patent is subject to a terminal disclaimer.

(21) Appl. No.: 11/745,072

(22) Filed: May 7, 2007

(65) Prior Publication Data

US 2007/0207361 A1 Sep. 6, 2007
US 2012/0052411 A9 Mar. 1, 2012

Related U.S. Application Data

(63) Continuation of application No. PCT/JP2005/020354, filed on Nov. 7, 2005.

(30) Foreign Application Priority Data

Nov. 10, 2004 (JP) ................................. 2004-326324
Nov. 10, 2004 (JP) ................................. 2004-326325

(51) Int. Cl.
*H01M 8/00* (2006.01)
(52) U.S. Cl. .......................... 429/400; 429/491; 429/492
(58) Field of Classification Search ................... 429/33, 429/491, 492, 400
See application file for complete search history.

(56) References Cited

U.S. PATENT DOCUMENTS

| 5,312,895 | A | 5/1994 | Dang et al. | |
|---|---|---|---|---|
| 2002/0091225 | A1* | 7/2002 | McGrath et al. | ............ 528/170 |
| 2004/0124091 | A1 | 7/2004 | Hohenthanner et al. | |
| 2005/0049320 | A1 | 3/2005 | Yoshida et al. | |
| 2006/0166048 | A1* | 7/2006 | Sakaguchi et al. | ............ 429/12 |

FOREIGN PATENT DOCUMENTS

| EP | 1 561 768 A1 | 8/2005 |
|---|---|---|
| EP | 1653541 A | 5/2006 |
| EP | 1 826 846 A1 | 8/2007 |
| JP | 06-093114 A | 4/1994 |
| JP | 2884189 B2 | 2/1999 |
| JP | 2002-105200 A | 4/2002 |
| JP | 2003-503510 A | 1/2003 |
| JP | 2003-257449 A | 9/2003 |
| JP | 2003-317737 A | 11/2003 |
| JP | 2004-149779 A | 5/2004 |
| JP | 2004-158260 A | 6/2004 |
| JP | 2004-193136 A | 7/2004 |
| JP | 2004-244437 A | 9/2004 |
| JP | 2004-253183 A | 9/2004 |
| JP | 2004-296274 A | 10/2004 |
| JP | 2004-323805 A | 11/2004 |
| JP | 2005-078849 A | 3/2005 |
| JP | 2005-135725 A | 5/2005 |
| JP | 2005-268059 A | 9/2005 |
| WO | WO 00/15691 | 3/2000 |
| WO | WO 00/24796 | 5/2000 |
| WO | WO 02/38650 A1 | 5/2002 |
| WO | WO 03/095509 A1 | 11/2003 |
| WO | WO 2004/033534 A1 | 4/2004 |
| WO | WO 2004/086584 A2 | 10/2004 |
| WO | 2006/051749 A1 | 5/2006 |

OTHER PUBLICATIONS

Takeshi Kobayashi, et al.: *Proton-conducting Polymers Derived from Poly(ether-ether-ketone) and Poly(4-phenoxybenzoyl-1, 4-phenylene)*, Solid State Ionics, vol. 106, pp. 219-225 (1998).
Jasun Lee, et al.: *Polyaromatic Ether-Ketone Sulfonamides Prepared from Polydiphenyl Ether-Ketones by Chlorosulfonation and Treatment with Secondary Amines*, Journal of Polymer Science, Polymer Chemistry, vol. 22, pp. 295-301 (1984).
B.C. Johnson, et al.: *Synthesis and Characterization of Sulfonated Poly(arylene Ether Sulfones)*, J. Polym. Sci., Polynm. Chem., vol. 22, pp. 721-737 (1984).
Takeshi Ogawa, et al.: *Polyaromatic Ether-Ketones and Ether-Keto-Sulfones Having Various Hydrophilic Groups*, Journal of Polymer Science, Polymer Chemistry Edition, vol. 23, No. 4, pp. 1231-1241 (1985).
Robert W. Kopitzke, et al.: *Conductivity and Water Uptake of Aromatic-Based Proton Exchange Membrane Electrolytes*, j. Electrochem. Soc., vol. 147, pp. 1677-1681 (2000).
K. Richau, et al.: *Electrochemical Characterization of Ionically conductive Polymer Membranes*, Macromol. Symp., vol. 188, pp. 73-89 (2002). Jinhwan Kim, et al.: *Effect of Casting Solvent on Morphology and Physical Properties of Partially Sulfonated Polystyrene-block-poly(ethylene-ran-butylene)-block-polystyrene Copolymers*, Macromol. Rapid. Commun., vol. 23, pp. 753-756 (2002).
G. Alberti, et al.: *Polymeric Proton conducting Membranes for Medium Temperature Fuel Cells (110-160° C)*, J. Memb. Sci., vol. 185, pp. 73-81 (2001).
Kenji Miyatake, et al.: *Synthesis and Properties of Poly(arylene ether)s Bearing Sulfonic Acid Groups on Pendant Phenyl Rings*, J. Polym. Sci., Polym. Chem., vol. 39, pp. 3211-3217 (2001).
S.M.J. Zaidi, et al.: *Proton conducting Composite Membranes from Polyether Ether Ketone and Heteropolyacids for Fuel Cell Applications*, J. Memb. Sci., vol. 173, pp. 17-34, (2000).
C. Genies, et al.: *Soluble Sulfonated Naphthalenic Polyimides as materials for proton Exchange Membranes*, Polymer, vol. 42, pp. 359-373 (2001).
Xiaoxia Guo et al.: *Novel Sulfonated polyimides as Polyelectrolytes for Fuel Cell Application. 2. synthesis and proton Conductivity of Polyimides from 9,9-Bis(4-aminophenyl)fluorene-2,7-disulfonic Acid*, Macromolecules, vol. 35, pp. 6707-6713 (2002).
Jianhua Fang et al.: *Novel sulfonated Polyimides as Polyelectrolytes for Fuel Cell Application. 1. Synthesis, Proton conductivity, and Water Stability of Polyimides from 4,4'-Diaminodiphenyl Ether-2,2'-disulfonic Acid*, Macromolecules, vol. 35, pp. 9022-9028 (2002).

(Continued)

*Primary Examiner* — Jane Rhee
(74) *Attorney, Agent, or Firm* — Kenyon & Kenyon LLP

(57) ABSTRACT

A proton exchange membrane is obtained which can give an excellent power generation characteristic when the membrane is applied to, in particular, a fuel cell wherein high-concentration methanol is used as a fuel. In the aromatic hydrocarbon based proton exchange membrane of the invention, the ion exchange capacity is set into the range of 0.6 to 1.3 meq/g. Moreover, the area swelling rate for a 30% by mass methanol aqueous solution at 40° C. is set into the range of 2 to 30%. Preferably, a sulfonic acid group is bonded to an aromatic ring of the aromatic hydrocarbon based polymer contained in the aromatic hydrocarbon based proton exchange film. Preferably, the aromatic hydrocarbon based polymer is a polyarylene ether based polymer.

10 Claims, No Drawings

OTHER PUBLICATIONS

Keikichi Uno, et al.: *Synthesis of Polybenzimidazoles with Sulfonic Acid*, J. Polym. Sci., Polym. Chem., vol. 15, pp. 1309-1318 (1977).

Feng Wang, et al.: *Sodium Sulfonate-functionalized Poly(ether ether ketone)s*, Macromol. Chem. Phys., vol. 199, pp. 1421-1426 (1998).

Feng Wang, et al.: *Synthesis of Poly(ether ether ketone) with High Content of Sodium Sulfonate Groups and Its membrane characteristics*, Polymer, vol. 40, pp. 795-799 (1999).

R. Nolte, et al.: *Partially Sulfonated Poly(arylene ether sulfone)—A Versatile Proton Conducting membrane Material for Modern Energy Conversion Technologies*, Journal of Membrane Science, 1993, vol. 83, pp. 211-220.

European Patent Office, Supplementary European Search Report in related European Application No. 05800360, dated Dec. 15, 2009.

\* cited by examiner

AROMATIC HYDROCARBON BASED PROTON EXCHANGE MEMBRANE AND DIRECT METHANOL FUEL CELL USING SAME

This application is a continuation of international application, No. PCT/JP2005/020354, with an international filing date of 7 Nov. 2005, claiming priority to Japanese Patent Applications No. 2004-326324 and No. 2004-326325 both filed 10 Nov. 2004, the contents of which are incorporated herein by reference.

TECHNICAL FIELD

The present invention relates to an aromatic hydrocarbon based proton exchange membrane useful as a polymeric electrolyte membrane for a direct methanol fuel cell wherein a high-concentration methanol aqueous solution is used as a fuel, and a direct methanol fuel cell using the same.

BACKGROUND ART

Direct methanol fuel cells are solid polymer fuel cells wherein methanol is used as a fuel to generate electric power, and are expected to be used as power sources for notebook size personal computers, PDAs, cellular phones, and so on. Direct methanol fuel cells have, as their center, a structure called a membrane electrode assembly (MEA), wherein a pair of electrodes are jointed to both faces of a proton exchange membrane. A methanol aqueous solution is supplied to one of the electrodes, and an oxidizing gas such as air is supplied to the other, whereby the structure can be operated as a cell. As the concentration of the methanol aqueous solution is higher, the energy density becomes higher; therefore, the cell can be driven for a long time and its fuel tank can be made small-sized. Thus, the cell is suitable for practical use.

About a polymeric membrane used in a water electrolysis cell or a fuel cell as an example of an electrochemical device wherein instead of a liquid electrolyte a polymeric solid electrolyte is used as an ion conductor, it is indispensable that the membrane has, as a cation exchange membrane, sufficiently chemical, thermal, electrochemical and mechanical stabilities as well as proton conductivity. For this reason, a perfluorocarbon sulfonic acid membrane, a typical example of which is "Nafion (registered trade name)" manufactured by Du Pont in USA, has mainly been used as a membrane which can be used over a long term. However, when the Nafion (registered trade name) membrane is used in a fuel cell wherein methanol is used as a fuel, there is remarkably caused a problem called a methanol crossover, which is a problem that methanol permeates into the Nafion (registered trade name) membrane to flow into the side of its air electrode. Thus, there arises a problem that the performance thereof as a cell falls. Furthermore, it is pointed out that an excessively high cost for the membrane hinders the establishment of fuel cell technique thereof. Accordingly, a low-concentration methanol aqueous solution has been used to restrain the methanol crossover into a minimum level. Consequently, the energy density becomes low and further the fuel tank becomes large-sized. Thus, this hinders the practical use.

One approach for overcoming such drawbacks is the development of a membrane wherein a methanol crossover is less caused. Various investigations have been made about, for example, an aromatic hydrocarbon based polymeric electrolyte membrane wherein a sulfonic acid group is introduced into a fluorine-free aromatic-ring-containing polymer, and a polymeric proton exchange membrane wherein a sulfonic acid group is introduced into a hydrocarbon based aromatic-ring-containing polymer. It is considered that the polymer skeleton thereof is advantageously a skeleton wherein a main chain skeleton has an aromatic ring structure, considering heat resistance and chemical stability. Thus, known is a skeleton wherein a sulfonic acid group is introduced into polyarylene ether, polyarylene, polyimide or some other polymer. Aromatic polyarylene ether compounds, such as aromatic polyarylene ether ketones and aromatic polyarylene ether sulfones, can also be expected as promising structures. Thus, the following are reported: a sulfonated polyaryl ether sulfone (see, for example, Journal of Membrane Science (the Netherlands), 1993, vol. 83, pp. 211-220 (Non-patent Document 1)), a sulfonated polyetheretherketone (see, for example, JP-A-6-93114 (Patent Document 1)), sulfonated polystyrene, and others.

However, the sulfonic acid group of these polymers, which is introduced onto their aromatic ring by sulfonation reaction, generally tends to be easily eliminated by heat. As the manner for canceling this, the following is reported: a monomer wherein a sulfonic acid group is introduced onto an electron-withdrawing aromatic ring is used and the monomer is polymerized to produce a thermally stable sulfonated polyaryl ether sulfone based compound (see, for example, US-A-2002/0091225 (Patent Document 2)), or a sulfonated polyarylene ether based compound (see JP-A-2004-244437 (Patent Document 3)).

A method for polymerizing a sulfonated monomer to give a sulfonated polymer directly is suggested in, for example, Patent Document 2, WO 2003/095509 Pamphlet (Patent Document 4), WO 2004/033534 Pamphlet (Patent Document 5), and WO 2004/086584 Pamphlet (Patent Document 6). The proton exchange membranes made of these polymers generally have a smaller methanol permeability value than perfluorocarbon sulfonic acid membranes. Thus, they are expected as materials promising for a direct methanol fuel cell. In membranes having high methanol permeability, such as a perfluorocarbon sulfonic acid membrane, power generating performance is not easily exhibited unless a diluted methanol aqueous solution is used. However, if a high concentration solution can be used, the system can be made compact so as to give a higher convenience. Aromatic hydrocarbon based polymeric membranes tend to exhibit a better power generation characteristic than perfluorocarbon sulfonic acid membranes. However, proton conductivity and methanol blocking property are in general properties incompatible with each other; thus, if the proton conductivity is made preferential, the methanol permeability becomes high so as to cause a fall in the power generation characteristic easily, and if the methanol blocking property is made preferential, the resistance of the membrane becomes high, thereby causing a fall in the power generation characteristic easily. For this reason, when a membrane wherein importance is attached to proton conductivity is used in an aromatic hydrocarbon based polymeric membrane also, methanol permeation from the fuel electrode to the counter electrode increases if the concentration of the fuel methanol aqueous solution is made high. As a result, the power generation characteristic does not become sufficient.

As an example wherein a proton exchange membrane as described above is applied to a direct methanol fuel cell, J. E. McGrath et al. of Department of Chemistry and Materials Research Institute in Virginia Polytechnich Institute and State University reports that a fuel cell having a relatively good proton conductivity and initial power generation characteristic was obtained. However, in this case also, the methanol concentration used in the direct methanol fuel cell is small, so that the above-mentioned problem is not solved. A cause therefor would be that as the methanol concentration is raised, the proton exchange membrane swells easily so that the electrode is peeled.

Patent Document 1: JP-A-6-93114
Patent Document 2: US-A-2002/0091225
Patent Document 3: JP-A-2004-244437
Patent Document 4: WO 2003/095509 Pamphlet
Patent Document 5: WO 2004/033534 Pamphlet
Patent Document 6: WO 2004/086584 Pamphlet
Non-patent Document 1: Journal of Membrane Science (the Netherlands), 1993, vol. 83, pp. 211-220

DISCLOSURE OF THE INVENTION

Problems to be Solved by the Invention

An object of the present invention is to provide an aromatic hydrocarbon based proton exchange membrane giving a good cell performance when a methanol aqueous solution having a high concentration of 25% or more by mass is used as a fuel, and a direct methanol fuel cell using the same.

Means for Solving the Problems

The inventors have made eager investigations so as to find out that when a proton exchange membrane having a specific area swelling rate is used in an aromatic hydrocarbon based proton exchange polymer, a direct methanol fuel cell can be provided wherein a high-concentration methanol aqueous solution can be used as a fuel.

Accordingly, the invention is directed to an aromatic hydrocarbon based proton exchange membrane, which is used to a direct methanol fuel cell in which a methanol aqueous solution having a concentration of 25% or more by mass is used as a fuel, and which contains an aromatic hydrocarbon based polymer, wherein the area swelling rate for a 30% by mass methanol aqueous solution (or the area swelling rate by action of a 30% by mass methanol aqueous solution) at 40° C. is from 2 to 30%.

The invention is also directed to an aromatic hydrocarbon based proton exchange membrane, which is used to a direct methanol fuel cell in which a methanol aqueous solution having a concentration of 25% or more by mass is used as a fuel, and which contains an aromatic hydrocarbon based polymer, wherein the ion exchange capacity is from 0.6 to 1.3 meq/g.

The invention is also directed to an aromatic hydrocarbon based proton exchange membrane, which is used to a direct methanol fuel cell in which a methanol aqueous solution having a concentration of 25% or more by mass is used as a fuel, and which contains an aromatic hydrocarbon based polymer, wherein the area swelling rate for a 30% by mass methanol aqueous solution at 40° C. is from 2 to 30% and the ion exchange capacity is from 0.6 to 1.3 meq/g.

The invention is also directed to any one of the aromatic hydrocarbon based proton exchange membranes wherein a sulfonic acid group is bonded onto its aromatic ring.

The invention is also directed to any one of the aromatic hydrocarbon based proton exchange membranes wherein the aromatic hydrocarbon based polymer is a polyarylene ether based polymer.

The invention is also directed to any one of the aromatic hydrocarbon based proton exchange membranes wherein the aromatic hydrocarbon based polymer contains one or more constituents represented by the following general formula (1) and/or general formula (2):

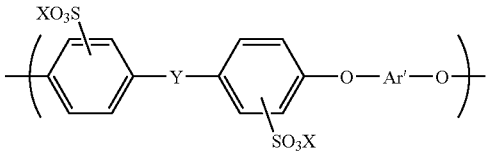

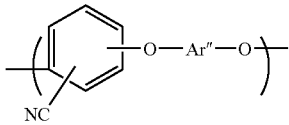

wherein Y represents a sulfone group, or a ketone group, X represents H or a monovalent cationic species, and Ar' and Ar" each represent a bivalent aromatic group which may contain a substituent.

The invention is also directed to any one of the aromatic hydrocarbon based proton exchange membranes wherein the value of the proton conductivity measured in water at 80° C. is not less than 3 times as large as the value of the proton conductivity measured in water at 25° C.

The invention is also directed to any one of the aromatic hydrocarbon based proton exchange membranes wherein the average film thickness is from 5 to 35 μm.

The invention is also directed to a direct methanol fuel cell wherein any one of the above-mentioned aromatic hydrocarbon based proton exchange membranes is used.

The invention is also directed to the direct methanol fuel cell wherein the cell temperature is set to 35° C. or higher.

Effects of the Invention

The aromatic hydrocarbon based proton exchange membrane of the invention (i.e., any one of the aromatic hydrocarbon based proton exchange membranes of the invention) contributes in particular to an increase in the energy density of fuel cells and a decrease in the size thereof since the membrane gives an excellent power generation characteristic in the case that the membrane is used in a direct methanol fuel cell wherein high-concentration methanol is used as a fuel.

BEST MODES FOR CARRYING OUT THE INVENTION

The inventors have made eager investigations about the selection and optimization of an aromatic hydrocarbon based proton exchange membrane used particularly in a direct methanol fuel cell wherein a high concentration methanol aqueous solution is used as a fuel. As a result, the invention has been made.

In a proton exchange membrane obtained by copolymerizing a component having, in its polymer skeleton, an anionic functional group contributing to the expression of proton conductivity, for example, a sulfonic acid group with a hydrophobic component not contributing to proton conductivity, which is made of, for example, an aromatic skeleton, the proton conductivity increases when the ratio of the amount of the proton conductive component is increased. However, in correlation with this matter, a methanol crossover also increases. On the other hand, if the ratio of the amount of the proton conductive component is decreased, a methanol crossover can also be restrained; however, the proton conductivity also falls. In other words, the channel wherein protons can be shifted is basically a hydrophilic moiety as well as the channel wherein methanol can be sifted; therefore, a positive correlation is present between the two.

Thus, when the proton exchange membrane which contains a large amount of a proton conductive component is compared with the proton exchange membrane which does not contain a very large amount of a proton conductive component, basic membrane properties therebetween, such as proton conductivity and methanol permeability, are different; however, factors producing effects on the generation of electric power are film (electric) resistance and the permeation rate of methanol, which depend on film thickness in addition to proton conductivity and the permeation coefficient of methanol. Therefore, when the film thickness of the proton exchange membrane wherein both of the proton conductivity and the methanol permeation coefficient are small is made small, the film can be rendered a film having properties close to those of a film wherein both of the proton conductivity and the methanol permeation rate are relatively high since the film resistance decreases and further the methanol permeation rate increases. In short, it can be generally said that it is important to select a proton exchange membrane wherein the methanol permeation coefficient, the proton conductivity and the film thickness are optimized.

In the case of using, in particular, a high-concentration methanol aqueous solution as a fuel, proton exchange membranes wherein various factors are combined can be supposed; the inventors have found out that only the following direct methanol fuel cell can endure long-term power generation: a direct methanol fuel cell formed by use of a proton exchange membrane wherein the area swelling rate for a methanol aqueous solution is restrained into a specific range. Thus, the invention has been made.

Accordingly, the invention is characterized by selecting and using, as a proton exchange membrane used in a direct methanol fuel cell wherein a high-concentration methanol aqueous solution is used as a fuel, a proton exchange membrane in which an aromatic hydrocarbon based polymer is contained and, in particular, the area swelling property for a methanol aqueous solution is small.

The proton exchange membrane in the invention is characterized by containing an aromatic hydrocarbon based polymer, and further it is important to select the area swelling rate (a detailed method for the estimation thereof will be described later) for a 30% by mass methanol aqueous solution at 40° C. into the range of 2 to 30%. In a direct methanol fuel cell using a proton exchange membrane wherein the area swelling rate is more than 30%, an initial performance equivalent to that of the direct methanol fuel cell of the invention, or a better initial performance under certain circumstances may be exhibited. However, when the area swelling rate is more than 30%, power for swelling the film with the methanol aqueous solution acts at the time of power generation; therefore, if a methanol aqueous solution having a concentration of 25% or more by mass is used as a fuel and the cell is driven, its electrodes come to be peeled from the proton exchange membrane. This causes an increase in the internal resistance of the cell. Thus, it is understood that the battery is finally unsuitable for use. On the other hand, in the proton exchange membrane wherein the area swelling rate is less than 2%, the adhesiveness between the proton exchange membrane and the electrodes is poor to cause a problem that a sufficient performance cannot be expressed. When the area swelling rate is selected into the range of 5 to 20%, a particularly good direct methanol fuel cell can be produced.

The area swelling rate of the Nafion (registered trade name) film, which is a perfluorocarbon sulfonic acid film, is from 50 to 60%; a result as described above, that is, a result that when the area swelling rate is large, a problem is caused about the jointability between the proton exchange membrane and electrodes is not particularly observed in the Nafion (registered trade name) film. The area swelling rate becomes a theme in any proton exchange membrane containing an aromatic hydrocarbon based polymer.

Additionally, out of aromatic hydrocarbon based proton exchange membranes generally having a characteristic that the crossover of methanol can be restrained while good proton conductivity is exhibited, the membranes being different from perfluorocarbon sulfonic acid based membranes that have mainly been used so far as proton exchange membranes for fuel cells, the invention provides a useful polymeric material which is in particular good in the effect of restraining the permeation of methanol so as to make it possible to give a fuel cell wherein the power generation efficiency is not easily lowered even if high-concentration methanol is used as a fuel. Accordingly, it has been found out that a proton exchange membrane is produced from a specific aromatic hydrocarbon based polymer wherein the ion exchange capacity ranges from 0.6 to 1.3 meq/g, whereby the membrane exhibits a particularly good power generating performance in a direct methanol fuel cell, wherein a methanol aqueous solution having a concentration of 25% or more by mass is used as a fuel. Thus, the invention has been made. If the ion exchange capacity is less than 0.6 meq/g, a good performance is exhibited to restrain the permeation of methanol; however, the proton conductivity becomes so low that the film resistance value becomes large. Thus, the power generation characteristic tends to be insufficient. If the ion exchange capacity is more than 1.3 meq/g, the proton conductivity is high. Thus, a film having a low film resistance value can be formed; however, at the same time, the methanol permeability also becomes large so that the power generation characteristic tends to fall. This tendency becomes remarkable, in particular, when the methanol concentration of the methanol aqueous solution, which is a fuel, becomes high. Thus, there is generated a tendency that a sufficient fuel cell characteristic cannot be obtained. When the ion exchange capacity is set into the range of 0.6 to 1.3 meq/g, a proton exchange membrane exhibiting a good power generation characteristic can be produced even if the methanol concentration is high. When the ion exchange capacity is in the range of 0.8 to 1.2 meq/g, it can be mentioned that the proton exchange membrane is a more preferred proton exchange membrane. The ion exchange capacity is more preferably from 0.9 to 1.1 meq/g. The aromatic hydrocarbon based proton exchange membrane of the invention has characteristics not only of having a high effect of restraining the permeability of methanol but also of keeping the effect of restraining the permeation of methanol at a high level even if the methanol concentration is made higher. Therefore, the methanol concentration at which this advantageous effect is clearly produced is 25% or more by mass. The methanol concentration is more preferably 30% or more by mass, and is even more preferably 40% or more by mass. In anode reaction in the fuel cell, equimolar amounts of methanol and water react with each other; thus, the methanol concentration is preferably about 65% or less by mass. The methanol concentration referred to herein is a concentration near a catalyst layer wherein the anode reaction is caused. Even if a methanol aqueous solution having, for example, a concentration of 25% or more by mass is put into a fuel tank and then the cell is used, a case in which the concentration is diluted in its electrode reaction section is not included in the scope of the invention.

The polymer for producing the proton exchange membrane will be described hereinafter.

The aromatic hydrocarbon polymer used in the proton exchange membrane of the invention is a polymer wherein a main component of constituents except bonding moieties is made of aromatic units. Since the aromatic units constitute the main components, the mechanical property, the thermal property, the chemical stability, and others become very good. Therefore, the structure of the polymer is not particularly limited as long as the polymer is included in the this category. The kind of the polymer used in the proton exchange membrane is preferably an aromatic hydrocarbon based proton-conductive polymer. An example thereof is any polymer wherein at least one of a sulfonic acid group, a phosphoric acid group, a carboxyl group, and derivatives thereof is introduced into a polymer containing at least one of polysulfone, polyethersulfone, polyphenyleneoxide, polyphenylenesulfide, polyphenylenesulfidesulfone, poly-p-phenylene, polyarylene based polymers, polyphenylquinoxaline, polyarylketone, polyetherketone, polybenzoxazole, polybenzthiazole, polybenzimidazole, polyimide, and other constituents. The polysulfone, polyethersulfone, polyetherketone, and so on referred to herein are generic terms of polymers containing, in the molecular chain thereof, a sulfonic bond, an ether bond, or a ketone bond. Examples thereof include polyetherketoneketone, polyetheretherketone, polyetheretherketoneketone, polyetherketoneetherketoneketone, and polyetherketonesulfone, and not limited to the specific polymeric structure.

To express proton conductivity, a sulfonic acid group can be introduced into these polymers. The sulfonic acid group may be bonded directly onto the aromatic ring, or may be bonded thereto with a side chain or some other spacer interposed therebetween. It is preferred that the sulfonic acid group is bonded onto the aromatic ring in order to make use of the stability of the sulfonic acid group or characteristics of the polymer as an aromatic polymer.

Out of the above-mentioned acidic-group-containing polymers, the polymer having, on its aromatic ring, a sulfonic acid group can be obtained by reacting a polymer having a skeleton as exemplified above with a sulfonating agent. As such a sulfonating agent, for example, the following agents, which are reported as an example wherein a sulfonic acid group is introduced into an aromatic-ring-containing polymer, are effective: an agent wherein concentrated sulfuric acid or fuming sulfuric acid is used (e.g., Solid State Ionics, 106, p. 219 (1998)); an agent wherein chlorosulfuric acid is used (e.g., J. Polym. Sci., Polym. Chem., 22, p. 295 (1984)); agents wherein a sulfuric anhydride complex is used (e.g., J. Polym. Sci., Polym. Chem., 22, p. 721 (1984), and J. Polym. Sci., Polym. Chem., 23, p. 1231 (1985)); and others. These agents are each used, and reaction conditions are selected in accordance with the used polymer, whereby a target sulfonic-acid-group-containing polymer can be obtained. A sulfonating agent described in Japanese Patent No. 2884189 can also be used.

The structure of these aromatic-ring-sulfonated polymers is not particularly limited, and examples thereof are described in, for example, J. Electrochem. Soc., vol. 147, p. 1677 (2000); WO 2000/15691 Pamphlet; WO 2000/24796 Pamphlet; Macromol. Symp., vol. 188, p. 73 (2002); Macromol. Rapid. Commun. vol. 23, p. 753 (2002); J. Memb. Sci., vol. 185, p. 73 (2001); J. Polym. Sci. Polym. Chem., vol. 39, p. 3211 (2001); and J. Memb. Sci., vol. 173, p. 17 (2000).

The polymers can each be synthesized by using a monomer having an ion exchangeable functional group, in particular, a monomer having an acidic group as at least one of the monomers used for polymerization. About a polyimide synthesized from an aromatic diamine and an aromatic tetracarboxylic dianhydride, for example, a sulfonic-acid-group-containing diamine is used as at least one species of the aromatic diamine, thereby making it possible to prepare a sulfonic-acid-group-containing polyimide as an acidic-group-containing polyimide.

Examples of the sulfonic-acid-group-containing diamine include 1,3-diaminobenzene-5-sulfonic acid, 1,4-diaminobenzene-2-sulfonic acid, 1,3-diaminobenzene-4-sulfonic acid, and benzidine-3,3'-disulfonic acid. Tetracarboxylic anhydrides which are used in the polyimide synthesis preferably include 6-membered acid anhydrides such as 1,4,5,8-naphtalenetetracarboxylic anhydride, and 3,4,9,10-perylenetetracarboxylic anhydride. The structure of these sulfonic-acid-group-containing polyimides are not particularly limited, and examples thereof are described in Polymer, vol. 42, p. 359 (2001); Macromolecules, vol. 35, p. 6707 (2002); Macromolecules, vol. 35, p. 9022 (2002); and US-A-2002/0091225.

In the case of polybenzoxazole synthesized from an aromatic diaminediol and an aromatic dicarboxylic acid, polybenzthiazole synthesized from an aromatic diaminedithiol and an aromatic dicarboxylic acid, and polybenzimidazole synthesized from an aromatic tetramine and an aromatic dicarboxylic acid, a sulfonic-acid-group-containing dicarboxylic acid or a phosphonic-acid-group-containing dicarboxylic acid is used as at least one of the aromatic dicarboxylic acid, thereby making it possible to prepare an acidic-group-containing polybenzoxazole, polybenzthiazole, and polybenzimidazole.

Examples of the sulfonic-acid-group-containing dicarboxylic acid used in this case include aromatic dicarboxylic acids having a sulfonic acid group, such as 2,5-dicarboxybenzenesulfonic acid, 3,5-dicarboxybenzenesulfonic acid, 2,5-dicarboxy-1,4-benzenedisulfonic acid, 4,6-dicarboxy-1,3-benzenesulfonic acid, 2,2'-disulfo-4,4'-biphenyldicarboxylic acid and 3,3'-disulfo-4,4'-biphenyldicarboxylic acid; and derivatives thereof. The aromatic tetramine, aromatic diaminediol, aromatic diaminedithiol and derivatives thereof used in this case are not particularly limited, and examples thereof include 2,5-dihydroxyparaphenylenediamine, 4,6-dihydroxymetaphenylenediamine, 2,5-diamino-1,4-benzenedithiol, 4,6-diamino-1,3-benzenedithiol, 2,5-diamino-3,6-dimethyl-1,4-benzenedithiol, 1,2,4,5-tatraaminobenzene, 3,3'-dihydroxybenzidine, 3,3'-diamino-4,4'-diphenylbenzenediol, 3,3'-dimercaptobenzidine, 3,3'-diamino-4,4'-diphenylbenzenedithiol, 3,3'-diaminobenzidine, bis(4-amino-3-hydroxyphenyl) ether, bis(3-amino-4-hydroxyphenyl) ether, bis(4-amino-3-mercaptophenyl) ether, bis(3-amino-4-mercaptophenyl) ether, 3,3',4,4'-tetraaminodiphenyl ether, bis(4-amino-3-hydroxyphenyl) thioether, bis(3-amino-4-hydroxyphenyl) thioether, bis(4-amino-3-mercaptophenyl thioether, bis(3-amino-4-mercaptophenyl) thioether, 3,3',4,4'-tetraaminodiphenyl thioether, bis(4-amino-3-hydroxyphenyl)sulfone, bis(3-amino-4-hydroxyphenyl)sulfone, bis(4-amino-3-mercaptophenylsulfone, bis(3-amino-4-mercaptophenyl)sulfone, 3,3',4,4'-tetraaminodiphenylsulfone, 2,2-bis(4-amino-3-hydroxyphenyl)propane, 2,2-bis(3-amino-4-hydroxyphenyl)propane, 2,2-bis(4-amino-3-mercaptophenyl)propane, 2,2-bis(3-amino-4-mercaptophenyl)propane, 2,2-bis(3,4-diaminophenyl)propane, bis(4-amino-3-hydroxyphenyl)methane, bis(3-amino-4-hydroxyphenyl)methane, bis(4-amino-3-mercaptophenyl methane, bis(3-amino-4-mercaptophenyl)methane, bis(3,4-diaminophenyl)methane, 2,2-bis(4-amino-3-hydroxyphenylhexafluoropropane, 2,2- bis(3-amino-4-hydroxyphenyl)hexafluoropropane, 2,2-bis(4-amino-3-mercaptophenyl)hexafluoropropane, 2,2-bis(3-amino-4-mercaptophenyl)hexafluoropropane, 2,2-bis(3,4-diaminophenyl)hexafluoropropane, 2,2-bis(4-amino-3-hydroxyphenyl) ketone, 2,2-bis(3-amino-4-hydroxyphenyl) ketone, 2,2-bis(4-amino-3-mercaptophenyl) ketone, 2,2-bis(3-amino-4-mercaptophenyl) ketone, 2,2-bis(3,4-diaminophenyl) ketone, bis(4-amino-3-hydroxyphenoxy)benzene, bis(3-amino-4-hydroxyphenoxy)benzene, bis(4-amino-3-mercaptophenoxy)benzene, bis(3-amino-4-mercaptophenoxy)benzene, and bis(3,4-diaminophenoxy)benzene; and derivatives thereof. The structure of these acidic-group-containing polybenzasols is not particularly limited, and examples thereof are described in J. Polym. Sci., Polym. Chem., vol. 15, p. 1309 (1977), U.S. Pat. No. 5,312,895, and WO 2002/38650 Pamphlet.

A polysulfone, a polyethersulfone, a polyetherketone, or the like that is synthesized from an aromatic dihalide and an aromatic diol can be synthesized by use of a sulfonic-acid-group-containing aromatic dihalide or a sulfonic-acid-group-containing aromatic diol as at least one monomer. In this case, the use of the sulfonic-acid-group-containing aromatic dihalide is preferred since the use makes the polymerization degree higher easily and gives an acidic-group-containing polymer having a higher thermal stability than the use of the sulfonic-acid-group-containing aromatic diol. Examples of the sulfonic-acid-group-containing aromatic dihalide include 3,3'-disulfo-4,4'-dichlorodiphenylsulfone, 3,3'-disulfo-4,4'-difluorodiphenylsulfone, 3,3'-disulfo-4,4'-dichlorophenyl ketone, and 3,3'-disulfo-4,4'-difluorodiphenylsulfone; and salts of the sulfonic acid group(s) thereof with one or two monovalent cationic species. These sulfonic-acid-group-containing dihalides can each be used together with an aromatic dihalide having no sulfonic acid group in order to control the amount of the sulfonic acid to be introduced. Examples of the aromatic dihalide having no sulfonic acid group include 4,4'-dichlorodiphenylsulfone, 4,4'-difluorodiphenylsulfone, 4,4'-difluorobenzophenone, 4,4'-dichlorobenzophenone, 2,6-dichlorobenzonitrile, and 2,6-difluorobenzonitrile. Examples of the aromatic diol used in the polymerization together with the above-mentioned aromatic dihalide(s) include 4,4'-biphenol, bis(4-hydroxyphenyl)sulfone, 1,1-bis(4-hydroxyphenyl)ethane, 2,2-bis(4-hydroxyphenyl)propane, bis(4-hydroxyphenyl)methane, 2,2-bis(4-hydroxyphenyl)butane, 3,3-bis(4-hydroxyphenyl)pentane, 2,2-bis(4-hydroxy-3,5-dimethylphenyl)propane, bis(4-hydroxy-3,5-dimethylphenyl)methane, bis(4-hydroxy-2,5-dimethylphenyl)methane, bis(4-hydroxyphenyl)phenylmethane, bis(4-hydroxyphenyl)diphenylmethane, 9,9-bis(4-hydroxyphenyl)fluorene, 9,9-bis(3-methyl-4-hydroxyphenyl)fluorene, 9,9-bis(3-phenyl-4-hydroxyphenyl)fluorene, 2,2-bis(4-hydroxyphenyl)hexafluoropropane, hydroquinone, resorcin, 2,6-naphthalenediol, 2,7-naphthalenediol, and 1,5-naphthalenediol. Besides, various aromatic diols can be used which can each be used for polymerization for a polyarylene ether based compound by aromatic nucleophilic substitution reaction. The structure of the sulfonic-acid-group-containing polyethersulfone or polyetherketone synthesized from these examples is not particularly limited, and examples thereof are described in US-A-2002/0091225, Macromol. Chem. Phys., vol. 199, p. 1421 (1998), Polymer, vol. 40, p. 795 (1995). These polyarylene ether based polymers are more preferred polymers than other aromatic polymers since the former polymers exhibit performances balanced between workability, stability, proton conductivity, methanol permeation restraining property and others.

The polymer for forming the proton exchange membrane in the invention is more preferably a sulfonic-acid-group-containing polysulfone, polyethersulfone, polyphenyleneoxide, polyphenylenesulfide, polyphenylenesulfidesulfone or polyetherketone based polymer; or any other polyarylene ether based compound that contains a sulfonic acid group.

The aromatic hydrocarbon based polymer, in particular, the polyarylene ether based polymer that is used in the proton exchange membrane of the invention preferably contains one or more constituents represented by the following general formula (1) and/or general formula (2), and the polymer more preferably contains both of constituents represented by the following general formulae (1) and (2):

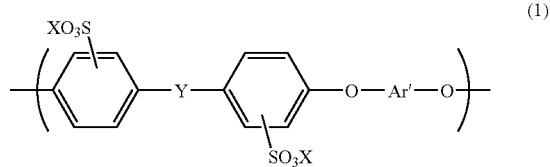

(1)

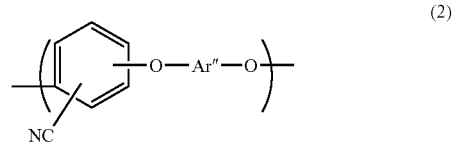

(2)

wherein Y represents a sulfone group, or a ketone group, X represents H or a monovalent cationic species, and Ar' and Ar" each represent a bivalent aromatic group which may contain a substituent.

The aromatic hydrocarbon based polymer, in particular, the polyarylene ether based polymer that is used in the proton exchange membrane of the invention preferably contains one or more constituents represented by the following general formula (3) and/or general formula (4), and the polymer more preferably contains both of constituents represented by the following general formulae (3) and (4):

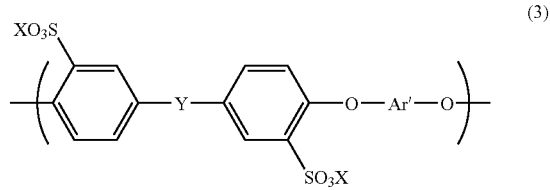

(3)

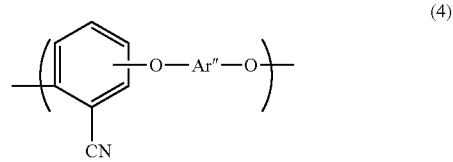

(4)

wherein Y represents a sulfone group, or a ketone group, X represents H or a monovalent cationic species, and Ar' and Ar" each represent a bivalent aromatic group which may contain a substituent.

The constituent represented by the general formula (2) is preferably a constituent represented by the following general formula (5):

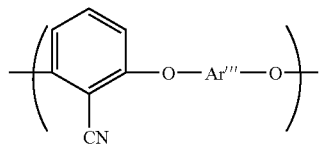
(5)

wherein Ar''' represents a bivalent aromatic group which may contain a substituent.

Besides, the sulfonic-acid-group-containing polyarylene ether based compound may contain a component crosslinkable by heat and/or light in the molecular chain thereof, that is, as the main chain, a side chain, or a terminal group of the polymer. An example of the thermally-crosslinkable group thereof is a reactive-unsaturated-bond-containing component such as an ethylene, ethynyl or ethynylene group. The thermally-crosslinkable group is not limited to these components, and may be any group capable of forming a new bond between polymer chains by reaction based on heat. Examples of the light-crosslinkable group include benzophenone, α-diketone, acyloin, acyloin ether, benzylalkyl ketal, acetophenone, thioxanthone, acylphosphine and ethylenical unsaturated groups; and polynuclear quinones. Particularly preferred is a combination of a group capable of generating a radical by light, such as a benzophenone group, with a group reactive with a radical, such as an aromatic group having a hydrocarbon group such as a methyl or ethyl group. In the case of using the ethylenical unsaturated group, it is preferred to add a photopolymerization initiator such as a benzophenone, α-diketone, acyloin, acyloin ether, benzylalkyl ketal, acetophenone, polynuclear quinone, thioxanthone, or acylphosphine compound.

The aromatic hydrocarbon based polymer, in particular, the sulfonic-acid-group-containing polyarylene ether based polymer that is used in the proton exchange membrane of the invention may contain a structural unit other than the units represented by the general formula (1) or (3) and the general formula (2) or (4). In this case, the amount of the structural unit other than the units represented by the general formula (1) or (3) or the general formula (2) or (4) is preferably 50% or less by mass. When the amount is set to 50% or less by mass, the proton exchange membrane can be rendered a proton exchange membrane wherein characteristics of the polymer are effectively used.

The polymer for forming the proton exchange membrane of the invention is in particular preferably a polymer containing a constituent represented by the following general formula (7) together with a constituent represented by the following general formula (6) since the polymer has a biphenylene structure, thereby decreasing the area swelling rate and exhibiting a high toughness:

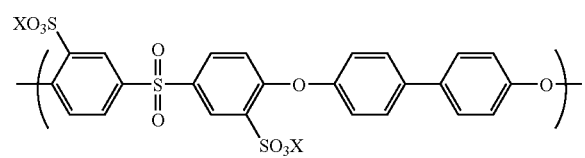
(6)

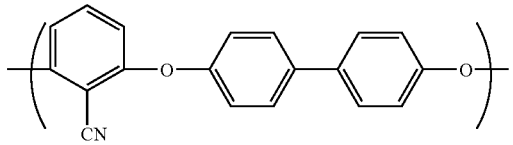
(7)

wherein X represents H or a monovalent cationic species.

The sulfonic-acid-group-containing polyarylene ether based polymer can be obtained by polymerizing compounds represented by general formulae (8) and (9) illustrated below, as monomers, by aromatic nucleophilic substitution reaction. Specific examples of the compound represented by the general formula (8) include 3,3'-disulfo-4,4'-dichlorodiphenylsulfone, 3,3'-disulfo-4,4'-difluorodiphenylsulfone, 3,3'-disulfo-4,4'-dichlorodiphenylketone, and 3,3'-disulfo-4,4'-difluorodiphenylketone; and salts of the sulfonic acid groups thereof with a monovalent cationic species. Examples of the monovalent cationic species include, but not limited to, sodium, potassium and other metal species; and various amines. Examples of the compound represented by the general formula (9) include 2,6-dichlorobenzonitrile, 2,6-difluorobenzonitrile, 2,4-dichlorobenzonitrile, and 2,4-difluorobenzonitrile.

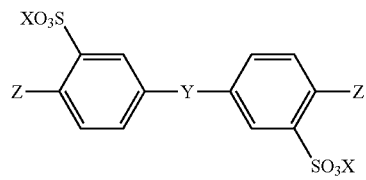
(8)

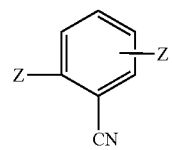
(9)

wherein Y represents a sulfone group, or a ketone group, X represents a monovalent cationic species, and Z represents chlorine or fluorine.

2,6-Dichlorobenzonitrile and 2,4-dichlorobenzonitrile, which are described above, have a relationship of isomers; thus, even if any one of the monomers is used in the invention, good proton conductivity, heat resistance, workability and dimensional stability can be attained. This would be because both of the monomers are excellent in reactivity and can further each constitute a small recurring unit, thereby hardening the structure of the whole of the molecule.

In the above-mentioned aromatic nucleophilic substitution reaction, various activated difluoro aromatic compounds or dichloro aromatic compounds can each be used as a monomer together with the compounds represented by the general formulae (8) and (9). Examples of these compounds include 4,4'-dichlorodiphenylsulfone, 4,4'-difluorodiphenylsulfone, 4,4'-difluorobenzophenone, 4,4'-dichlorobenzophenone, and decafluorobiphenyl. However, the compounds are not limited thereto, and may be other aromatic dihalogen compounds, aromatic dinitro compounds, aromatic dicyano compounds or the like that have activity onto aromatic nucleophilic substitution reaction.

These compounds may be used alone or in the form of a mixture of two or more thereof. It is preferred to use, out of these compounds, the dihalogen compound(s) represented by the general formula (8) and/or the general formula (9).

In general, Ar' in the constituent represented by the general formula (1) or (3) and Ar" in the constituent represented by the general formula (2) or (4) are each a structure introduced from the aromatic diol component monomer used together with the compound(s) represented by the general formula (8) and/or (9) in aromatic nucleophilic substitution polymerization. Examples of the aromatic diol monomer include 4,4'-biphenol, bis(4-hydroxyphenyl)sulfone, 1,1-bis(4-hydroxyphenyl)ethane, 2,2-bis(4-hydroxyphenyl)propane, bis(4-hydroxyphenyl)methane, 2,2-bis(4-hydroxyphenyl)butane, 3,3-bis(4-hydroxyphenyl)pentane, 2,2-bis(4-hydroxy-3,5-dimethylphenyl)propane, bis(4-hydroxy-3,5-dimethylphenyl)methane, bis(4-hydroxy-2,5-dimethylphenyl)methane, bis(4-hydroxyphenyl)phenylmethane, bis(4-hydroxyphenyl)diphenylmethane, 9,9-bis(4-hydroxyphenyl)fluorene, 9,9-bis(3-methyl-4-hydroxyphenyl)fluorene, 9,9-bis(3-phenyl-4-hydroxyphenyl)fluorene, 2,2-bis(4-hydroxyphenyl)hexafluoropropane, hydroquinone, resorcin, 1,4-dihydroxynaphthalene, 1,8-dihydroxynaphthalene, 1,5-dihydroxynaphthalene, 1,6-dihydroxynaphthalene, 1,7-dihydroxynaphthalene, 2,6-dihydroxynaphthalene, 2,7-dihydroxynaphthalene, bis(4-hydroxyphenyl) ketone, bis(4-hydroxyphenyl) ether, and bis(4-hydroxyphenyl) thioether. Besides, various aromatic diol compounds which can be used in the polymerization for a polyarylene ether based compound by aromatic nucleophilic substitution reaction can be used. These aromatic diols can be used alone, or plural ones from the diols can be used together.

A substituent may be bonded to these aromatic diols, examples of the substituent including a methyl group, halogens, a cyano group, a sulfonic acid group, and salt compounds thereof. The kind of the substituent is not particularly limited, and the number of the substituents is preferably from 0 to 2 per aromatic ring. These aromatic diols can be used alone, or plural ones from the diols can be used together.

In the polymerization for the polyarylene ether based compound of the invention, a halogenated aromatic hydroxy compound can be added as a reactive monomer component for the polymerization. The halogenated aromatic hydroxy compound used in this case is not particularly limited, either. Examples thereof include 4-hydroxy-4'-chlorobenzophenone, 4-hydroxy-4'-fluorobenzophenone, 4-hydroxy-4'-chlorodiphenylsulfone, 4-hydroxy-4'-fluorodiphenylsulfone, 4-chloro-4'-(p-hydroxyphenyl)diphenylsulfone, and 4-fluoro-4'-(p-hydroxyphenyl)benzophenone. These can be used alone, or in the form of a mixture of two or more thereof.

In the case of the introduction of the above-mentioned crosslinkable terminal structure, the structure can be obtained by adding a monofunctional terminal sequestering agent, which can give a crosslinked-group-containing terminal structure, at the time of the polymerization for the polyarylene ether based compound of the invention. Specific examples of the monofunctional terminal sequestering agent include 3-fluoropropene, 3-fluoro-1-propyne, 4-fluoro-1-butene, 4-fluoro-1-butyne, 3-fluorocyclohexene, 4-fluorostyrene, 3-fluorostyrene, 2-fluorostyrene, 4-fluoroethynylbenzene, 3-fluoroethynylbenzene, α-fluoro-4-ethynyltoluene, 4-fluorostylbene, 4-(phenylethynyl)fluorobenzene, 3-(phenylethynyl)fluorobenzene, 3-chloropropene, 3-chloro-1-propyne, 4-chloro-1-butyne, 4-chloro-1-butene, 3-chlorocyclohexene, 4-chlorostyrene, 3-chlorostyrene, 2-chlorostyrene, 4-chloroethynylbenzene, 3-chloroethynylbenzene, α-chloro-4-ethynyltoluene, 4-chlorostylbene, 4-(phenylethynyl)chlorobenzene, 3-(phenylethynyl)chlorobenzene, 3-hydroxypropene, 3-hydroxy-1-propyne, 4-hydroxy-1-butene, 4-hydroxy-1-butyne, 4-hydroxystyrene, 3-hydroxystyrene, 2-hydroxystyrene, 4-hydroxyethynylbenzene, 3-ethynylphenol, 4-ethynylbenzyl alcohol, 4-hydroxystylbene, 4-(phenylethynyl)phenol, 3-(phenylethynyl)phenol, 4-chlorobenzophenone, 4-fluorobenzophenone, 4-hydroxybenzophenone, 4-methylphenol, 3-methylphenol, 2-methylphenol, 4-ethylphenol, 3-ethylphenol, 4-propylphenol, 4-butylphenol, 4-pentylphenol, and 4-benzylphenol. These monofunctional terminal sequestering agents may be used alone or may be used in the form of a mixture of two or more thereof.

Specific examples of the crosslinkable-group-containing monomer include 1-butene-3,4-diol, 3,5-dihydroxystyrene, 3,5-dihydroxystylbene, 1-butyne-3,4-diol, 1-butene-3,4-diol, 2,4-hexadiyne-1,6-diol, 2-ethynylhydroquinone, 2-(phenylethynyl)hydroquinone, 5-ethynylresorcin, 2-butene-1,4-diol, 4,4'-dihydroxystylbene, 1,4-butynediol, 1,2-bis(4-hydroxyphenyl)acetylene, 1,2-bis(3-hydroxyphenyl)acetylene, 3,3-difluoropropene, 3,3-difluoropropyne, 3,3,3-trifluoropropyne, 3,4-difluoro-1-butene, 1,4-difluoro-2-butene, 3,4-difluoro-1-butyne, 1,4-difluoro-2-butyne, 1,6-difluoro-2,4-hexadiyne, 3,4-difluorostyrene, 2,6-difluorostyrene, 2,5-difluoroethynylbenzene, 3,5-difluoroethynylbenzene, α,α-difluoro-4-ethynyltoluene, α,α,α-trifluoro-4-ethynyltoluene, 2,4-difluorostylbene, 4,4'-difluorostylbene, 1,2-bis(4-fluorophenyl)acetylene, 3,4-difluoro(phenylethynyl)benzene, 3,3-dichloropropene, 3,3-dichloropropyne, 3,3,3-trichloropropyne, 3,4-dichloro-1-butene, 1,4-dichloro-2-butene, 3,4-dichloro-1-butyne, 1,4-dichloro-2-butyne, 3,4-dichlorostyrene, 2,6-dichlorostyrene, 2,4-difluorocinnamic acid, 2,5-dichloroethynylbenzene, 3,5-dichloroethynylbenzene, α,α-dichloro-4-ethynyltoluene, α,α,α-trichloro-4-ethynyltoluene, 2,4-dichlorostylbene, 4,4'-dichlorostylbene, 1,2-bis(4-chlorophenyl)acetylene, 3,4-dichloro(phenylethynyl)benzene, 4,4'-dihydroxybenzophenone, 4,4'-dichlorobenzophenone, 4,4'-difluorobenzophenone, 4-chlorobenzophenone, 4-fluorobenzophenone, 4-hydroxybenzophenone, 1,1-bis(4-hydroxyphenyl)ethane, 2,2-bis(4-hydroxyphenylpropane, bis(4-hydroxyphenyl)methane, 2,2-bis(4-hydroxyphenyl)butane, 3,3-bis(4-hydroxyphenyl)pentane, 2,2-bis(4-hydroxy-3,5-dimethylphenyl)propane, bis(4-hydroxy-3,5-dimethylphenyl)methane, bis(4-hydroxy-2,5-dimethylphenyl)methane, bis(4-hydroxyphenyl)phenylmethane, 4-benzylresorcin, 2,5-dimethylresorcin, and 4-ethylresorcin. When these crosslinkable monomers are each added at the time of the polymerization for the polyarylene ether based compound of the invention, a crosslinkable group can be introduced to the inside of the molecular chain.

In the case of polymerization for the sulfonic-acid-group-containing polyarylene ether based polymer by aromatic nucleophilic substitution reaction, an activated difluoro aromatic compound and/or a dichloro aromatic compound which contain(s) compounds represented by the general formulae (8) and (9) are caused to react with an aromatic diol in the presence of a basic compound, whereby the polymer can be obtained. The polymerization can be conducted in the temperature range of 0 to 350° C. The temperature is preferably from 50 to 250° C., more preferably from 50 to 230° C. If the temperature is lower than 0° C., the reaction tends not to advance sufficiently. If the temperature is higher than 350° C., the decomposition of the polymer tends to start. The reaction can be conducted in the absence of any solvent. The reaction is preferably conducted in a solvent. Examples of the solvent that can be used include N-methyl-2-pyrrolidone, N,N-dimethylacetoamide, N,N-dimethylformaldehyde, dimethylsulfoxide, diphenylsulfone, and sulfolane. However, the solvent is not limited thereto, and may be any solvent that can be used as a stable solvent in aromatic nucleophilic substitution reaction. These solvents may be used alone or in the form of a mixture of two or more thereof. Examples of the basic compound include sodium hydroxide, potassium hydroxide, sodium carbonate, potassium carbonate, sodium hydrogencarbonate, and potassium hydrogencarbonate. However, the basic compound is not limited thereto, and may be any compound capable of turning an aromatic diol into an active phenoxide structure. In the aromatic nucleophilic substitution reaction, water may be produced as a byproduct. In this case, water can be removed as an azeotrope outside the system by causing toluene or the like, which is unrelated to the polymerization solvent, to coexist in the reaction system. The method for removing water outside the system may be use of a water-absorbent, such as a molecular sieve. When the aromatic nucleophilic substitution reaction is conducted in the solvent, the monomers are charged (or used) so as to give preferably a polymer concentration of 5 to 50% by mass, more preferably that of 5 to 40% by mass. If the concentration is less than 5% by mass, the polymerization degree tends not to rise easily. On the other hand, if the concentration is more than 50% by mass, the viscosity of the reaction system tends to become too high so that the reactant is not easily after-treated. In the polymerization, it is preferred to charge the monomers at a time at the first stage of the reaction, thereby yielding a polymer having a sequence distribution wherein the degree of randomness is high. After the end of the polymerization reaction, the solvent is removed by evaporation from the reaction solution and, if necessary, the residue is washed, thereby yielding a desired polymer. Alternatively, the reaction solution is added to a solvent having a low polymer-dissolving performance to precipitate a polymer in the form of a solid, and then the precipitation is filtrated off, whereby a polymer can be yielded. If necessary, filtrating treatment may be conducted before the generation of any precipitation.

About the sulfonic-acid-group-containing polyarylene ether based polymer of the invention, the polymer logarithm viscosity measured by a method that will be described later is preferably 0.1 or more. If the logarithm viscosity is less than 0.1, at the time of molding the polymer into a proton exchange membrane the membrane tends to become brittle with ease. The logarithm viscosity is more preferably 0.3 or more. On the other hand, if the logarithm viscosity is more than 5, the polymer is not easily dissolved, and other problems about the workability tend to be caused with ease. The solvent for measuring the logarithm viscosity may be generally a polar organic solvent such as N-methylpyrrolidone or N,N-dimethylacetamide. When the solubility of the polymer in these solvents is low, the logarithm viscosity may be measured by use of concentrated sulfuric acid.

The aromatic hydrocarbon based polymer of the invention can be used alone. The compound can be used as a resin composition wherein the compound is combined with a different polymer. The polymer is not particularly limited, and examples thereof include polyesters such as polyethylene terephthalate, polybutylene terephthalate and polyethylene naphthalate, polyamides such as nylon 6, nylon 6,6, nylon 6,10, and nylon 12, acrylate resins such as polymethyl methacrylate, polymethacrylates, polymethyl acrylate, and polyacrylates, polyacrylic acid resins, polymethacrylic acid resins, various polyolefins such as polyethylene, polypropylene, polystyrene and diene polymers, polyurethane resins, cellulose resins such as cellulose acetate and ethyl cellulose, aromatic polymers such as polyarylate, aramide, polycarbonate, polyphenylenesulfine, polyphenyleneoxide, polysulfone, polyethersulfone, polyetheretherketone, polyetherimide, polyimide, polyamideimide, polybenzimidazole, polybenzoxazole and polybenzthiazol, and thermosetting resins such as epoxy resin, phenol resin, novolak resin and benzoxadine resin. A resin composition of the polyarylene ether based polymer with a basic polymer such as polybenzimidazole or polyvinylpyridine is a preferred combination for an improvement in polymer dimensional stability. A case in which an acidic group such as a sulfonic acid group or a phosphonic acid group is introduced into the basic polymer is more preferred from the viewpoint of the workability of the composition. When the sulfonic-acid-group-containing polyarylene ether based compound of the invention is used in the form of such a resin composition, the content by percentage of this compound in the whole of the resin composition is preferably 50% or more by mass and less than 100% by mass, more preferably 70% or more by mass and less than 100% by mass. If the content of the sulfonic-acid-group-containing polyarylene ether based compound of the invention is less than 50% by mass of the whole of the resin composition, the concentration of the sulfonic acid group in the ion conductive membrane containing this resin composition becomes low so that a good proton conductivity tends not to be obtained. Units each containing the sulfonic acid group tend to become a discontinuous phase so that the mobility of conducting ions lowers. If necessary, the compound and the composition of the invention may contain: various additives such as an antioxidant, a thermal stabilizer, a lubricant, a tackifier, a plasticizer, a crosslinking agent, a viscosity adjustor, an antistatic agent, an antibacterial agent, an antifoaming agent, a disperser, a polymerization inhibitor and a radical inhibitor; and a noble metal, an inorganic compound, an inorganic-organic hybrid compound or an ionic liquid for controlling characteristics of the proton exchange membrane. Plural ones out of the additives may coexist as far as circumstances permit.

The polymer used in the above-mentioned acidic-group-containing basic polymer combined composition is preferably acidic-group-containing polybenzimidazole containing a constituent represented by the following general formula (10):

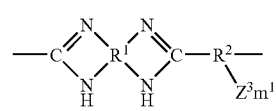

In the general formula (10), $m^1$ represents an integer of 1 to 4, $R^1$ represents a tetravalent aromatic bonding unit capable of forming an imidazole ring, $R^2$ represents a bivalent aromatic unit, and $R^1$ and $R^2$ may each be a single ring, or a bonded body of plural aromatic rings or a condensed ring thereof, and may each have a stable substituent. $Z^3$ represents a sulfonic acid group and/or a phosphonic acid group, a part of which may be turned into a salt structure.

The route for synthesizing the acidic-group-containing polybenzimidazole based compound containing a structure represented by the general formula (10) is not particularly limited. Usually, the compound can be synthesized by reaction of one or more compounds selected from the group consisting of aromatic tetramines capable of forming the imidazole ring in the compound and derivatives thereof with one or more compounds selected from the group consisting of aromatic dicarboxylic acids and derivatives thereof. In the case of using, as at least one of the dicarboxylic acids used at this time, a dicarboxylic acid containing a sulfonic acid group, a phosphonic acid group or a salt thereof, the sulfonic acid group or the phosphonic acid group can be introduced into the resultant polybenzimidazole. About the sulfonic-acid-group-containing dicarboxylic acids, a combination of one or more thereof may be used as well as about the phosphonic-acid-group-containing dicarboxylic acids. It is also permissible to use one or more of the sulfonic-acid-group-containing dicarboxylic acids and one or more of the phosphonic-acid-group-containing dicarboxylic acids at the same time.

In this case, the benzimidazole bonding units, the sulfonic-acid-group- and/or phosphonic-acid-group-containing aromatic dicarboxylic acid bonding units, the aromatic dicarboxylic acid bonding units which neither contain any sulfonic acid group nor any phosphonic acid group, and other bonding units, which are constituents of the polybenzimidazole based compound, are preferably bonded by random polymerization and/or alternate polymerization. The polymerization style of these units is not limited to one style. Two or more polymerization styles may be present together in the same compound.

The polymer and the resin composition described above are each formed into a film-form molded body by extrusion, rolling, casting or some other method, whereby a proton exchange membrane can be produced. It is particularly preferred to form a molded body from a solution wherein the polymer or the composition is dissolved in an appropriate solvent. The solvent can be appropriately selected from aprotic polar solvents such as N,N-dimethylformamide, N,N-dimethylacetoamide, dimethylsulfoxide, N-methyl-2-pyrrolidone and hexamethylphosphonamide; alcohols such as methanol and ethanol; ethers; ketones; and mixed solvents made of one or more thereof and water. However, the solvent is not limited thereto. About these solvents, plural ones selected therefrom may be used in a mixture form as long as circumstances permit. The concentration of the compound in the solution is preferably from 0.1 to 50% by mass. If the compound concentration in the solution is less than 0.1% by mass, a good molded body tends not to be easily obtained. If the concentration is more than 50% by mass, the workability tends to deteriorate. The method for obtaining the molded body from the solution may be a method known in the prior art. The solution is heated, subjected to reduced pressure drying, or immersed into a nonsolvent, for the compound, which is miscible with the solvent wherein the compound is dissolved, thereby removing the solvent. In such a way, the film can be obtained.

Out of methods for forming the proton exchange membrane, the most preferred method is casting of the solution. As described above, the solvent is removed from the cast solution to make it possible to yield the proton exchange membrane. The removal of the solvent is preferably based on drying from the viewpoint of uniformity of the proton exchange membrane. To avoid the decomposition or denaturation of the compound or the solvent, the solution may be dried at a temperature as low as possible under a reduced pressure. When the viscosity of the solution is high, the solution is cast at a high temperature in the state that the substrate or the solution is heated, thereby lowering the viscosity of the solution. Thus, the casting can easily be attained. In the case that the solvent is an organic solvent, it is preferred to distill off the solvent by heating or pressure reduction drying. The sulfonic acid groups in the thus-obtained film may contain groups in the form of a salt with a cationic species. If necessary, the film is subjected to acid treatment, whereby the salt-form groups may be converted to free sulfonic acid groups. The thickness of the solution when it is cast is not particularly limited, and is preferably from 10 to 2500 µm, more preferably from 10 to 1500 µm, and even more preferably from 50 to 500 µm. The thickness is even more preferably from 50 to 1500 µm. If the thickness of the solution is less than 10 µm, the resultant film tends not to keep a form as a proton exchange membrane. If the thickness is more than 2500 µm, a nonuniform proton exchange membrane tends to be easily formed. The method for controlling the cast thickness of the solution may be a known method. The thickness can be controlled, for example, by making the thickness into a specified thickness by use of an applicator, a doctor blade or the like, or by varying the amount of the solution or the concentration thereof in the state that the cast area is made constant by use of a glass petri dish, a frame for preventing the solution from flowing out, or the like. The cast solution can be made into a uniform film by adjusting the speed of removing the solvent. In the case of removing the solvent by, for example, heating, there is used a method of lowering the evaporation speed at a low temperature at an initial stage, and subsequently raising the temperature. For example, in the case of immersing the product, which is obtained by casting the solution, into a nonsolvent such as water, the product is left in the air or an inert gas for an appropriate time, thereby adjusting the solidification speed of the compound or the solvent removing speed. The proton exchange membrane of the invention can be made into an arbitrary film thickness in accordance with the purpose. The thickness is preferably as small as possible from the viewpoint of proton conductivity. Specifically, the thickness is preferably from 3 to 200 µm, more preferably from 5 to 150 µm, even more preferably from 5 to 50 µm, and even more preferably from 5 to 35 µm. If the thickness of the proton exchange membrane is smaller than 3 µm, the proton exchange membrane is not easily handled. Thus, when a fuel cell is formed, a short circuit or the like may be caused. If the thickness is larger than 200 µm, the proton exchange membrane tends to become too tough so that the proton exchange membrane is not easily handled. Besides, the electric resistance of the proton exchange membrane tends to becomes too high so that the power generating performance falls. In the invention, the produced film has been described as a proton exchange membrane; however, it is also preferred to process the film into a hollow fiber form. At the time of the processing, a known manner can be used.

When the finally-obtained proton exchange membrane is used, the ionic functional groups in the membrane may partially be groups converted into the form of a metal salt. Preferably, the groups are in the form of an acid converted by an appropriate acid treatment. At this time, the proton conductivity of the proton exchange membrane is preferably $1.0 \times 10^{-3}$ S/cm or more. When the proton conductivity is $1.0 \times 10^{-3}$ S/cm or more, a good output tends to be obtained from the fuel cell using the proton exchange membrane. If the conductivity is less than $1.0 \times 10^{-3}$ S/cm, a fall in the output of the fuel cell tends to be caused.

In order to prevent a methanol crossover, the methanol permeation rate is preferably from 0.1 to 3.0 mmol/m²/s, more preferably less than 2.5 mmol/m²/s.

The proton exchange membrane of the invention is characterized in that the ion exchange capacity, which is from 0.6 to 1.3 meq/g, is a low value for an aromatic hydrocarbon polymer based compound that is usually used. Therefore, in the case of using a polymer having a lower ion exchange capacity, it is preferred to select a smaller film thickness out of the preferred range of the film thickness. In the case of using the membrane as a proton exchange membrane, the sulfonic groups in the membrane may partially or whole be converted into the form of a metal salt, or may be converted into the form of free sulfonic acid by an appropriate acid treatment. In this case, it is also effective to immerse the membrane into an aqueous solution of sulfuric acid, hydrochloric acid or the like in the state that the solution is heated or not heated.

The proton exchange membrane of the invention also has a characteristic that about the proton conductivity, a higher performance is exhibited, in particular, under a condition that the temperature is higher. When the value of the proton conductivity measured in water at 80° C. is not less than 3 times as large as that of the proton conductivity in water at 25° C., a better power generating performance is exhibited in the operating of the membrane in a direct methanol fuel cell, in particular, at room temperature or higher. It is more preferred that the value of the proton conductivity measured in water at 80° C. is not less than 4 times as large as that of the proton conductivity in water at 25° C.

When electrodes are jointed onto both surfaces of the aromatic hydrocarbon polymer based proton exchange membrane in the invention, an MEA can be obtained. In general, the electrodes are each in a form composed of two or more layers, including a gas diffusion layer and a catalyst layer. Usually, the catalyst layer is formed on the proton exchange membrane and the gas diffusion layer is arranged outside it. The kind of the catalyst, the kind of the gas diffusion layer used in each of the electrodes, the method for jointing the electrodes, and others are not particularly limited, and may be known ones, or combinations of known techniques. The catalyst used in the electrodes can be appropriately selected from the viewpoint of acid resistance and catalyst activity. Particularly preferred are platinum group based metals, or alloys or oxides thereof. It is suitable for high-efficiency power generation to use platinum or a platinum based alloy for a cathode and use platinum, a platinum based alloy, an alloy of platinum and ruthenium for an anode. Plural species of catalysts may be used, and the catalyst species may have a distribution. The porosity of the inside of the electrodes is not particularly limited. The kind, the amount and other factors of a proton conductive resin mixed with the catalyst in the catalyst layer are not particularly limited. It is also preferred to use a method for controlling the gas diffusibility of the gas diffusion layer and the catalyst layer, for example, impregnation with a hydrophobic compound, a typical example of which is a fluorine-contained binder. About the technique for jointing each of the electrodes to the proton exchange membrane, it is important not to generate a large resistance in the interface between the two. It is also important not to generate exfoliation or the peeling-off of the electrode catalyst by swelling or shrinkage of the membrane or mechanical force based on gas generation. The method for forming this jointed body may be a method known as a technique known in the prior art for jointing electrodes and a membrane in a fuel cell, preferred examples of the method including a method called the decal method, i.e., the method of mixing catalyst-carrying carbon, a proton exchange resin, and an optional water repellent material such as polytetrafluoroethylene to produce a catalyst ink in advance, painting this uniformly onto a film made of Teflon (registered trade name), polypropylene or the like, drying the ink, transferring only the catalyst layer thermally onto the membrane, and further overlapping the resultant onto a separately-formed gas diffusion layer, or a method of precipitating the catalyst ink by spray, ink-jet, or the like, and then overlapping the resultant onto a gas diffusion layer.

When the MEA is set in a direct methanol fuel cell, a fuel cell having good performances can be provided. In the direct methanol fuel cell of the invention, wherein a methanol aqueous solution having a concentration of 25% or more by mass is used as a fuel, it is important to use a proton exchange membrane wherein the area swelling rate is selected in the specified range. When a proton exchange membrane made of an aromatic hydrocarbon based polymer having a large area swelling rate is used in a fuel cell wherein a high-concentration methanol aqueous solution is used as a fuel, the initial power generating performance thereof is very good since its MEA is satisfactorily formed. However, when the fuel cell is used for a long term, the electrodes are peeled off by stress for swelling. Thus, the good performance cannot be maintained. In the meantime, the direct methanol fuel cell according to the invention is particularly good in that the peeling-off of the electrodes is not observed and the MEA can be kept in a good state. As described above, if the concentration of the methanol aqueous solution is low, the energy density is low and the cell unfavorably becomes large-sized; accordingly, this case is undesired for practical use. Thus, the concentration of the methanol aqueous solution is preferably higher than 25% by mass, more preferably 30% or more by mass. If the concentration of the methanol aqueous solution is more than 60% by mass, the oxidization reaction of methanol is not smoothly caused; thus, this case is not preferred.

The following are not particularly limited: the kind of a separator used in the fuel cell, the flow rate of oxidizing gas, a typical example of which is air, the method for supplying the gas, the structure of a channel for the gas, the method and conditions for operating the cell, the temperature distribution, the method for controlling the cell, and others. In accordance with the method of supplying the methanol aqueous solution to the direct methanol fuel cell, the concentration of the methanol aqueous solution supplied to the fuel tank is more than 25% by mass. However, when a diluting mechanism is set to the device, the concentration of the methanol aqueous solution supplied to the MEA can be set to a considerably smaller diluted-value than 25% by mass. However, the concentration value of 25% by mass referred to about the direct methanol fuel cell of the invention is the concentration of the methanol aqueous solution supplied to the MEA. Accordingly, the concentration value does not mean the concentration of the methanol aqueous solution supplied to the fuel tank.

The aromatic hydrocarbon polymer based proton exchange membrane of the invention is preferably a proton conductive membrane having a methanol permeation rate of 5 mmol/m$^2$·sec. or less, the rate being obtained by forming the membrane which has an average thickness of 50 μm and then making a measurement by use of a 5M methanol aqueous solution at 25° C. The methanol permeation rate is more preferably 2 mmol/m$^2$·sec. or less, more preferably 1 mmol/m$^2$·sec. or less since a particularly good power generation characteristic is exhibited when such methanol permeability is exhibited. The methanol permeability depends on the film thickness in some cases; thus, the methanol permeability is evaluated on the basis of the formation of a sample having an average thickness of 50 μm. However, when the present invention is actually used as an ion conductive membrane for a fuel cell, the film thickness thereof is not particularly limited. Preferably, the film thickness can be specified in the above-mentioned range. The film having an average thickness of 50 μm in the evaluation of the methanol permeability means a film having an average film thickness in the range of 48 to 52 μm. The proton exchange membrane made of the aromatic hydrocarbon polymer based compound of the invention also has a characteristic that the methanol permeability is not easily affected by temperature. In aromatic hydrocarbon based proton exchange membranes, the swelling property into methanol generally increases when the temperature becomes high. Thus, the methanol permeation rate also tends to become remarkably large. However, in the aromatic hydrocarbon polymer based proton exchange membrane of the invention, the swelling property into methanol based on temperature rise does not become larger than in other polymers. Accordingly, the membrane of the invention can exhibit a good power generation characteristic even if the power generation temperature is higher than 35° C. Besides, the increase in the proton conductivity is large when the temperature becomes high, as described above. This matter would be a factor for exhibiting a good power generation characteristic even if the temperature is higher than 35° C. When the power generation temperature is 45° C. or higher, the invention is more preferred than other proton exchange membranes. When the power generation temperature is 55° C. or higher, the invention is even more preferred. This excellent characteristic is more useful when a fuel having a high methanol concentration is used. The matter that this characteristic is exhibited means that a good temperature characteristic is exhibited not only in the case of using a methanol aqueous solution as a fuel but also in the case of using a different fuel such as hydrogen. In the case of the direct methanol fuel cell, the power generation temperature is preferably 100° C. or lower since the fuel is a methanol aqueous solution.

When a component crosslinkable by heat and/or light is contained in the proton exchange membranes made of the aromatic hydrocarbon polymer based compound of the invention and a resin composition thereof, the dimensional stability can be made better by introducing a crosslinked structure thereto by thermal treatment and/or light radiating treatment. The heating temperature when the component is thermally treated, which is varied by the structure of the crosslinkable polymer, the kind of the crosslinkable group, the amount of the introduced crosslinkable group, and others, is usually from 150 to 450° C., preferably from 200 to 400° C. The heating time, which is varied by the heating time and the structure of the crosslinkable polymer, and others, is usually from 0.01 to 50 hours, preferably from 0.02 to 24 hours. The pressure may be any one of normal pressure, reduced pressure, and increased pressure. The gas atmosphere may be any of air atmosphere, nitrogen atmosphere, and argon atmosphere. When the heating temperature is high, it is preferred to conduct the thermal treatment in the state that the sulfonic acid group is turned into a salt form. The light source used in the light crosslinking is not particularly limited, and may be a low-pressure mercury lamp, a high-pressure mercury lamp, a xenon lamp, a metal halide lamp, or the like. The radiation dose, which is varied by the structure of the polymer and the film thickness thereof, is usually from 100 to 50000 mJ/cm$^2$, preferably from 300 to 30000 mJ/cm$^2$.

The proton exchange membrane, the film or the like of the invention is jointed to electrodes, whereby a jointed body composed of the proton exchange membrane, the film or the like and the electrodes can be obtained. The method for forming this jointed body may be a method known in the prior art, and may be, for example, a method of painting an adhesive onto a surface of each of the electrodes and then bonding the proton exchange membrane and the electrodes, or a method of heating and pressing the proton exchange membrane and the electrodes. Of these, preferred is a method of painting an adhesive made mainly of the aromatic hydrocarbon polymer based compound of the invention and a resin composition thereof onto a surface of each of the electrodes, and then bonding them since the adhesion between the proton exchange membrane and the electrode would be improved and further the proton conductivity of the proton exchange membrane would be less damaged.

By use of the above-mentioned jointed body, which is composed of the proton exchange membrane, the film or the like and the electrodes, a fuel cell can be formed. The ion conductive film, the film or the like of the invention is excellent in heat resistance, workability, proton conductivity and dimension stability; therefore, it is possible to provide a fuel cell which can endure even if the cell is driven at high temperature, can easily be formed, and gives a good power. It is also preferred to use the ion conductive film or the like as a fuel cell wherein methanol is directly used as a fuel, as described above.

EXAMPLES

Working examples of the invention will be described hereinafter, but the invention is not limited to the examples.

Examples 1 to 4, and Comparative Examples 1 to 4

Evaluating Method/Measuring Method
<Film Thickness of Proton Exchange Membrane>
The thickness of a proton exchange membrane was obtained by making a measurement using a micrometer (Mitutoyo Standard Micrometer 0-25 mm 0.01 mm). The proton exchange membrane was allowed to stand still in a measuring room wherein the room temperature and the humidity were controlled into 20° C. and 30±5 RH %, respectively, for 24 hours or more, and then the membrane was cut into a sample having a size of 5×5 cm. The thicknesses at 20 points therein were measured, and the average value thereof was defined as the film thickness.
<Ion Exchange Capacity (Acid Type)>
The amount of acid-type functional groups present in an ion exchange membrane was measured as the ion exchange capacity (IEC). For sample preparation, a sample piece (5×5 cm) was first dried under the flow of nitrogen gas in an oven at 80° C. for 2 hours, and further the piece was allowed to stand still in a desiccator filled with silica gel for 30 minutes. Thereafter, the dry weight (Ws) was measured. Next, into a 200 mL air-tight type glass bottle were put 200 mL of a 1 mol/L sodium chloride solution in ultrapure water, and the above-mentioned sample, which was already weighed. While the bottle was closely shut, the solution was stirred at room temperature for 24 hours. Next, 30 mL of the solution was taken out, and then neutralization-titrated with a 10 mM aqueous sodium hydroxide solution (commercially available standard solution). The following equation was used to calculate the IEC on the basis of the titration amount (T):

$$IEC(meq/g)=10T/(30Ws)\times 0.2$$

wherein unit of T: mL, and unit of Ws: g.
<Area Swelling Rate>
For a start in the measurement of the area swelling rate, the area (As) of the sample in a dry state, the preparing method of which has been described in the section of <Ion Exchange Capacity (Acid Type)>, was correctly measured. Next, the sample was immersed in 200 mL of a 30% by mass methanol aqueous solution at 40° C. put in an airtight type glass bottle for 2 hours while the solution was stirred. Thereafter, the glass bottle was cooled with water, thereby lowering the temperature of the methanol aqueous solution approximately to room temperature. Next, the sample was taken out from the glass bottle, and immediately the area (Aw) of the sample swelled by action of the methanol aqueous solution was measured. The following equation was used to calculate the area swelling rate:

$$\text{Area swelling rate }(\%)=(Aw-As)/As\times 100(\%)$$

<Proton Conductivity>

The proton conductivity a was measured as follows: platinum wires (diameter: 0.2 mm) were pushed onto a surface of a membrane sample in the form of a stripe of 10 mm width on a measuring probe (made of polytetrafluoroethylene) of the inventors' own making, and then the sample was immersed together with the probe in ultrapure water, the temperature of which was adjusted to 25° C.; and the a. c. impedance was measured with a 1250 FREQUENCY RESPONSE ANALYSER manufactured by Solartron Co. The measurement was made while the distance between the electrodes was changed from 10 mm to 40 mm at intervals of 10 mm. From the gradient Dr [Ω/cm] of a linear line obtained by plotting the distance between the electrodes and the measured resistance values, the proton conductivity was calculated, with the cancellation of the contact resistance between the membrane and the platinum wire, from the following equation:

$\sigma[S/cm]=1/(\text{film width} \times \text{film thickness[cm]} \times Dr)$

<Methanol Permeation Rate and Methanol Permeation Coefficient>

The methanol permeation rate and the methanol permeation coefficient of a proton exchange membrane were measured in the following manners: a proton exchange membrane immersed, for 24 hours, in a 5 mol/L methanol aqueous solution (for the preparation of the methanol aqueous solution, commercially available methanol in an extra pure grade and ultrapure water (18 MΩ·cm) were used), the temperature of which was adjusted to 25° C., was sandwiched between H-shaped cells; 100 mL of a 5 mol/L methanol aqueous solution was poured into one of the cells and 100 mL of ultrapure water was poured into the other; and while the insides of the two cells were stirred at 25° C., the amount of methanol diffusing across the proton exchange membrane into the ultrapure water was measured by gas chromatography, so as to calculate the rate and the coefficient (the area of the proton exchange membrane was 2.0 cm²). Specifically, the following equation was used to make the calculation on the basis of the methanol concentration change rate [Ct] (mmol/L/s) in the cell in which the ultrapure water was put:

Methanol permeation rate[mmol/m²/s]=(Ct[mmol/L/s]×0.1[L])/2×10⁻⁴[m²]

Methanol permeation coefficient[mmol/m/s]=Methanol permeation rate[mmol/m²/s]×film thickness [m]

<Power Generation Characteristic>

To a 20% solution of Nafion (registered trade name) manufactured by Du Pont Co. were added a 54% platinum/ruthenium catalyst carried carbon commercially available, a small amount of ultrapure water and isopropanol, and then the solution was stirred until the solution was homogeneous, thereby preparing a catalyst paste. An applicator was used to paint this catalyst paste uniformly onto a carbon paper TGPH-060 manufactured by Toray Industries, Inc., so as to set the adhesion amount of platinum to 1.7 mg/cm², and then the paste was dried, thereby forming a catalyst-layer-attached gas diffusion layer for anode. In the same way, an electrode catalyst layer was formed on the above-mentioned carbon paper which was separately made hydrophobic, using a 40% platinum catalyst carried carbon commercially available instead of the platinum/ruthenium catalyst carried carbon, thereby forming a catalyst-layer-attached gas diffusion layer for cathode (1.1 mg-platinum/cm²). Each of proton exchange membranes in working examples and comparative examples was sandwiched between the two catalyst-layer-attached gas diffusion layers, so as to bring the catalyst layers into contact with the membrane. By means of a hot pressing machine, the sandwich was pressed and heated at 180° C. for 3 minutes to produce an MEA. The MEA was set in a fuel cell manufactured by Electrochem Co., for evaluation and then at a cell temperature of 40° C., a 40° C. methanol aqueous solution having a concentration of 30% by mass and dry air were supplied into the anode and the cathode, respectively. At the same time, a discharge test was made at a current density of 0.1 A/cm². At this time, the voltage was examined. In the measurement, values after 3 hours and 300 hours from the time when the operation of the cell was started were used as typical values to evaluate the characteristic.

Example 1

Prepared was a mixture of a disodium salt of 3,3'-disulfo-4,4'-dichlorodiphenylsulfone, 2,6-dichlorobenzonitrile, 4,4'-biphenol, and potassium carbonate to set the mol ratio therebetween into 1.00/5.62/6.62/7.62, and then 15 g of the mixture was weighed and put into a 100 mL four-necked flask, together with 3.50 g of a molecular sieve. Nitrogen was then caused to flow in the flask. NMP as a solvent was used. The solution was stirred at 155° C. for one hour, and then the reaction temperature was raised up to 190-200° C. The reaction was continued until the viscosity of the system was sufficiently raised (for about 4 hours). After the solution was naturally cooled, the molecular sieve, which precipitated, was removed, and a polymer was precipitated in a strand form in water. The resultant polymer was washed in boiled ultrapure water for 1 hour, and then dried. A 30% solution of the polymer in NMP was prepared. The polymer solution was cast into a thin film by casting, and dried at 80° C. and subsequently at 130° C. for 5 hours to form a film. Next, the film was immersed into a 2 mol/L aqueous solution of sulfuric acid overnight. The film was then washed with water 5 times, fixed onto a flame, and dried at room temperature to produce an aromatic hydrocarbon based proton exchange membrane. Table 1 shows physical properties of this aromatic hydrocarbon based proton exchange membrane and the power generation characteristic of a direct methanol fuel cell of Example 1 produced by use of the aromatic hydrocarbon based proton exchange membrane.

Example 2

An aromatic hydrocarbon based proton exchange membrane and a direct methanol fuel cell of Example 2 were produced in accordance with the method in Example 1 except that the mol ratio of the disodium salt of 3,3'-disulfo-4,4'-dichlorodiphenylsulfone/2,6-dichlorobenzonitrile/4,4'-biphenol/potassium carbonate was set to 1.00/3.44/4.44/5.15. Physical properties of the proton exchange membrane and the power generation characteristic are shown in Table 1.

Example 3

An aromatic hydrocarbon based proton exchange membrane and a direct methanol fuel cell of Example 3 were produced in accordance with the method in Example 1 except that the mol ratio of the disodium salt of 3,3'-disulfo-4,4'-dichlorodiphenylsulfone/2,6-dichlorobenzonitrile/4,4'-biphenol/potassium carbonate was set to 1.00/2.45/3.45/4.00. Physical properties of the proton exchange membrane and the power generation characteristic are shown in Table 1.

Example 4

An aromatic hydrocarbon based proton exchange membrane and a direct methanol fuel cell of Example 4 were produced in accordance with the method in Example 1 except that the mol ratio of the disodium salt of 3,3'-disulfo-4,4'-dichlorodiphenylsulfone/2,6-dichlorobenzonitrile/4,4'-biphenol/potassium carbonate was set to 1.00/2.13/3.13/3.63. Physical properties of the proton exchange membrane and the power generation characteristic are shown in Table 1.

biphenol/potassium carbonate was set to 1.00/15.7/16.7/19.22. Physical properties of the proton exchange membrane and the power generation characteristic are shown in Table 1.

Comparative Example 4

A Nafion (registered trade name) 117 membrane was used as a proton exchange membrane to produce a direct methanol fuel cell of Comparative Example 4. Physical properties of the proton exchange membrane and the power generation characteristic are shown in Table 1.

TABLE 1

| | Proton exchange membrane physical properties | | | | | | Power generation characteristic | |
|---|---|---|---|---|---|---|---|---|
| | | Proton conductivity [S/cm] | | Methanol permeation | Methanol permeation | Area swelling | | |
| | Film thickness [μm] | IEC [meq/g] | at 25° C. in water | at 80° C. in water | coefficient [mmol/m/s] | rate [mmol/m²/s] | rate [%] | Cell performance after 3 hours [V at 0.1 A/cm²] | Cell performance after 300 hours [V at 0.1 A/cm²] |
| Example 1 | 10 | 0.84 | 0.007 | 0.038 | $0.2 \times 10^{-4}$ | 2 | 5 | 0.32 | 0.32 |
| Example 2 | 40 | 1.22 | 0.022 | 0.066 | $1.0 \times 10^{-4}$ | 2.5 | 15 | 0.29 | 0.3 |
| Example 3 | 85 | 1.49 | 0.05 | 0.11 | $1.9 \times 10^{-4}$ | 2.2 | 22 | 0.31 | 0.29 |
| Example 4 | 120 | 1.60 | 0.07 | 0.15 | $2.3 \times 10^{-4}$ | 1.92 | 28 | 0.31 | 0.30 |
| Comparative Example 1 | 160 | 1.83 | 0.09 | 0.24 | $3.0 \times 10^{-4}$ | 1.88 | 40 | 0.35 | 0.1 |
| Comparative Example 2 | 250 | 2.01 | 0.14 | 0.34 | $3.8 \times 10^{-4}$ | 1.5 | 67 | 0.36 | 0.14 |
| Comparative Example 3 | 2 | 0.37 | $5 \times 10^{-4}$ | $2 \times 10^{-3}$ | — | — | 1 | Unable to be measured | — |
| Comparative Example 4 | 180 | 0.91 | 0.1 | 0.18 | $6.7 \times 10^{-4}$ | 3.72 | 55 | 0.15 | 0.15 |

Comparative Example 1

An aromatic hydrocarbon based proton exchange membrane and a direct methanol fuel cell of Comparative Example 1 were produced in accordance with the method in Example 1 except that the mol ratio of the disodium salt of 3,3'-disulfo-4,4'-dichlorodiphenylsulfone/2,6-dichlorobenzonitrile/4,4'-biphenol/potassium carbonate was set to 1.00/1.70/2.70/3.10. Physical properties of the proton exchange membrane and the power generation characteristic are shown in Table 1.

Comparative Example 2

An aromatic hydrocarbon based proton exchange membrane and a direct methanol fuel cell of Comparative Example 2 were produced in accordance with the method in Example 1 except that the mol ratio of the disodium salt of 3,3'-disulfo-4,4'-dichlorodiphenylsulfone/2,6-dichlorobenzonitrile/4,4'-biphenol/potassium carbonate was set to 1.00/1.26/2.26/2.63. Physical properties of the proton exchange membrane and the power generation characteristic are shown in Table 1.

Comparative Example 3

An aromatic hydrocarbon based proton exchange membrane and a direct methanol fuel cell of Comparative Example 3 were produced in accordance with the method in Example 1 except that the mol ratio of the disodium salt of 3,3'-disulfo-4,4'-dichlorodiphenylsulfone/2,6-dichlorobenzonitrile/4,4'-

The proton exchange membranes of the Examples and the proton exchange membranes of the Comparative Examples were different from each other in proton conductivity; therefore, the thicknesses thereof were adjusted to make the resistance values of the films as even as possible. About the resultant methanol permeation rates of the proton exchange membranes, the rates of the aromatic hydrocarbon based proton exchange membranes of the Examples were from about 2 to 2.5 mmol/m²/s, the rates of the aromatic hydrocarbon based proton exchange membranes of Comparative Examples 1 and 2 were from about 1.5 to 2 mmol/m²/s, and the rate of the fluorine-contained membrane of Comparative Example 4 was about 3.7 mmol/m²/s. About the methanol permeation rates of the proton exchange membranes, the films of Comparative Examples 1 and 2 were superior. Thus, the direct methanol fuel cells of Comparative Examples 1 and 2 were slightly better than the direct methanol fuel cells of the Examples about the power generation characteristic after the operating for 3 hours. In the meantime, the direct methanol fuel cell of Comparative Example 4, wherein the fluorine-contained film was used, was poor in performances since a methanol crossover was remarkable in the proton exchange membrane. When the concentration of a methanol aqueous solution as a fuel is low, good performances can be obtained even if a methanol crossover is caused; however, when a high-concentration methanol aqueous solution is used as a fuel, the cell is unsuitable for use. When the performances after the cells generated electric power for 300 hours are compared, the performances of the direct methanol fuel cells of the Examples were each kept good whereas the performances of Comparative Examples 1 and 2 lowered remarkably. The cells were decomposed after the power generation test. As a result, a situation that their catalyst layers were peeled off was observed and further the films swelled conspicuously. Because of such results, when a proton exchange membrane having a large area swelling rate is used in a direct methanol fuel cell wherein a high-concentration methanol aqueous solution is used as a fuel, the cell cannot endure long-term use thereof since the action of swelling the proton exchange membrane works. The cells of the Examples were also decomposed. As a result, it was not observed that these changed conspicuously. Accordingly, in a direct methanol fuel cell wherein a high-concentration methanol aqueous solution is used as a fuel and an aromatic hydrocarbon based proton exchange membrane is used, it is important to use a proton exchange membrane wherein the area swelling rate is controlled into 30% or less. About the fluorine-contained membrane of Comparative Example 4, the area swelling rate was as large as 55%, but the initial performance was maintained. The matter that the area swelling rate becomes a theme is peculiar to aromatic hydrocarbon based proton exchange membranes. About the proton exchange membrane of Comparative Example 3, the proton conductivity was very small; thus, the thickness of the film was also as thin as 2 μm. For this reason, a problem was caused about the handleability. Thus, there was a possibility that wrinkles or bending was easily generated. The following was caused, which probably resulted from this matter: when the methanol permeation coefficient and the methanol permeation rate were measured, methanol leaked from the drawbacks so that precise values were unable to be measured. The adhesiveness between the proton exchange membrane and the electrodes was also poor. Thus, no MEA was able to be produced in accordance with the method of the Examples. Accordingly, no cell performance was evaluated. It is understood from the above-mentioned results that the use of the aromatic hydrocarbon based proton exchange membrane of the invention, which contains an aromatic hydrocarbon based polymer and has an area swelling rate of 2 to 30%, makes it possible to use a methanol aqueous solution having a concentration of 25% or more by mass as a fuel, and give a direct methanol fuel cell which works stably for a long term.

Examples 5 to 8, and Comparative Examples 5 to 7

Evaluating Method and Measuring Method

Solution viscosity: Polymer powder was dissolved in N-methylpyrrolidone to give a concentration of 0.5 g/dL. The viscosity thereof was measured, using an Ubbelohde type viscometer in a thermostat of 30° C. temperature. The solution viscosity was evaluated on the basis of the logarithm viscosity ln [ta/tb]/c wherein ta represents the number of seconds for the dropping of the sample solution, tb represents the number of seconds for dropping of only the solvent, and c represents the polymer concentration. TGA: A thermogravimeter (TGA-50) manufactured by Shimadzu Corp. was used to measure the TGA at a temperature-raising rate of 10° C./min. in the atmosphere of Ar (the system was kept at 150° C. for 30 minutes in the middle of the measurement to remove water content sufficiently).

Proton conductivity measurement: Platinum wires (diameter: 0.2 mm) were pushed onto a surface of a membrane sample in the form of a stripe on a measuring probe (made of Teflon (registered trade name)) of the inventors' own making, and then the sample was held in a constant-temperature and constant-humidity oven (LH-20-01, manufactured by Nagano Science Co. Ltd.) at 80° C. and 95% RH. The impedance between the platinum wires was measured with a 1250 FREQUENCY RESPONSE ANALYZER manufactured by Solartron Co. The measurement was made while the distance between the electrodes was changed. From the gradient obtained by estimating the distance between the electrodes and C-C plots, the conductivity with the cancellation of the contact resistance between the membrane and the platinum wire was calculated as the proton conductivity on the basis of an equation described below. The measuring probe was immersed into ultrapure water kept at 25° C. or 80° C., and the same measurement was made to calculate the proton conductivity in water.

Conductivity[S/cm]=1/(film width[cm]×film thickness [cm]×gradient[Ω/cm]between the resistance electrodes)

Ion exchange capacity: A sample dried in the atmosphere of nitrogen overnight was weighed, and the sample and a sodium hydroxide solution in water were stirred. Thereafter, the solution was subjected to back titration with an aqueous hydrochloric acid solution to obtain the ion exchange capacity (IEC).

Methanol permeation rate: The present measurement of the methanol permeation rate was made by forming a film having an average thickness of 50 μm. The film having an average thickness of 50 μm in this case means any film substantially having an average thickness in the range of 48 to 52 μm. The film immersed, for 24 hours, in a 5 M (mol/liter) or 10 M methanol aqueous solution, the temperature of the solution being adjusted to 25° C., was sandwiched between H-shaped cells, and 100 mL of a 5 M methanol aqueous solution was poured into one of the cells and 100 mL of ultrapure water (18 MΩ·cm) was poured into the other. While the inside of the two cells were stirred at 25° C., the amount of methanol diffusing across the proton exchange membrane into the ultrapure water was measured by gas chromatography, so as to calculate the rate (the area of the proton exchange membrane was 2.0 cm$^2$). Power generation evaluation: A small amount of ultrapure water and isopropyl alcohol was added to a Pt/Ru catalyst carried carbon (TEC61E54, manufactured by Tanaka Kikinzoku Kogyo K.K.) to moisten the carbon. Thereafter, a 20% Nafion (registered trade name) solution (article number: SE-20192) manufactured by Du Pont Co. was added thereto so as to give a ratio by mass of the Pt/Ru catalyst carried carbon to the Nafion of 2.5/1. Next, the resultant was stirred to prepare a catalyst paste for anode. This catalyst paste was painted onto a carbon paper TGPH-060 manufactured by Toray Industries, Inc., which would be a gas diffusion layer, by screen printing, so as to set the adhesion amount of platinum to 0.8 mg/cm$^2$, and then the paste was dried, thereby forming an electrode-catalyst-layer attached carbon paper for anode. Moreover, a small amount of ultrapure water and isopropyl alcohol was added to a Pt catalyst carried carbon (TEC10V40E, manufactured by Tanaka Kikinzoku Kogyo K.K.) to moisten the carbon. Thereafter, a 20% Nafion solution (article number: SE-20192) manufactured by Du Pont Co. was added thereto so as to give a ratio by mass of the Pt catalyst carried carbon to the Nafion of 2.5/1. The resultant was stirred to prepare a catalyst paste for cathode. This catalyst paste was painted onto a carbon paper TGPH-060 manufactured by Toray Industries, Inc., and subjected to water repellent finishing, so as to set the adhesion amount of platinum to 0.8 mg/cm$^2$. The paste was then dried, thereby forming an electrode-catalyst-layer-attached carbon paper for cathode. A membrane sample was sandwiched between the two electrode-catalyst-layer-attached carbon papers so as to bring the electrode catalyst layers into contact with the membrane sample. By a hot pressing method, the sandwich was pressed and heated at 130° C. and 8 MPa for 3 minutes to produce a membrane-electrode jointed body. The jointed body was set in a fuel cell FC25-02SP manufactured by Electrochem Co., for evaluation and then a fuel cell power generation tester (manufactured by Toyo Corp.) was used to make a power generation test. Electric power was generated at a cell temperature of 40° C. while a 5 M or 8 M methanol aqueous solution (1.5 mL/min.), the temperature of which was adjusted to 40° C., and highly pure oxygen gas (80 mL/min.) were supplied into the anode and the cathode, respectively.

Example 5

The following were weighed and put into a 200 mL four-necked flask: 10.0000 g (0.020356 mol) of a disodium salt of 3,3'-disulfo-4,4'-dichlorodiphenylsulfone (abbreviation: S-DCDPS), 14.0059 (0.081425 mol) of 2,6-dichlorobenzonitrile (abbreviation: DCBN), 18.9527 g (0.101781 mol) of 4,4'-biphenol, and 16.1773 g (0.11705 mol) of potassium carbonate. Nitrogen was caused to flow therein.

Thereto was added 120 mL of N-methyl-2-pyrrolidone. The solution was heated and stirred, and the reaction temperature was raised to 195-200° C. to conduct reaction for 5 hours. After the solution was naturally cooled, the polymer solution was poured into water to precipitate a polymer in a strand form. The resultant polymer was immersed in fresh water for one day, and then dried. The logarithm viscosity of the polymer was 1.18.

Into 21 mL of NMP was dissolved 9 g of the polymer, and the solution was cast onto a glass plate on a hot plate to give a thickness of about 450 μm. NMP was distilled off until the solution turned into a film form, and then the resultant was immersed in water overnight or longer. The resultant film was immersed in diluted sulfuric acid (concentrated sulfuric acid: 6 mL, and water: 300 mL) for one day to cancel the form of the salt. Thereafter, the resultant was immersed in pure water for one hour two times to remove the acid components, and then dried. The dried film had an average thickness of 50 μm.

The proton conductivity of the present film was measured. The value at 80° C. and 95% RH was 0.039 S/cm, and that at 25° C. in water was 0.016 S/cm. The proton conductivity at 80° C. in water was 0.069 S/cm. According to the thermogravity measurement of the film, the weight loss starting temperature (measured on the basis of the sample mass at 200° C.) was 310° C., and the 3% weight loss temperature was 386° C. The IEC obtained by the titration was 1.13 meq/g. The 5 M methanol permeation rate was 1.2 mmol/m$^2$·sec., and the 10 M methanol permeation rate was 4.0 mmol/m2·sec.

A film having an average thickness of 30 μm was formed and the power generation thereof was evaluated in the same way as described above except that the cast thickness was changed. As a result, the voltage at a current density of 0.05 A/cm$^2$ was 0.25 V in the case of the 5 M methanol aqueous solution, and was 0.22 V in the case of the 8 M methanol aqueous solution.

Examples 6A to 6D

A polymer was synthesized, and a film was produced and evaluated in the same way as in Example 5 except that the blend ratio between S-DCDPS and DCBN was changed. The results are shown in Table 2.

Comparative Examples 5A and 5B

A polymer was synthesized, and a film was produced and evaluated in the same way as in Example 5 except that the blend ratio between S-DCDPS and DCBN was changed. The results are shown in Table 2.

TABLE 2

| | | Example 5 | Example 6A | Example 6B | Example 6C | Example 6D | Example 7 | Example 8 | Comparative Example 5A | Comparative Example 5B | Comparative Example 7 |
|---|---|---|---|---|---|---|---|---|---|---|---|
| Composition (mol ratio) | S-DCDPS | 20 | 12 | 15 | 17 | 23 | — | — | 10 | 28 | — |
| | DCBN | 80 | 88 | 85 | 83 | 77 | — | — | 90 | 72 | — |
| Film thickness (μm) | | 50 | 50 | 50 | 50 | 50 | 50 | 50 | 50 | 50 | 50 |
| IEC (meq/g) | | 1.13 | 0.70 | 0.86 | 0.93 | 1.24 | 0.98 | 0.97 | 0.59 | 1.44 | 1.59 |
| Proton conductivity (S/cm) | 80° C., 95% RH | 0.039 | 0.006 | 0.011 | 0.025 | 0.041 | 0.026 | 0.029 | 0.001 | 0.08 | 0.14 |
| | at 25° C. in water | 0.016 | 0.004 | 0.007 | 0.012 | 0.022 | 0.014 | 0.018 | 0.0004 | 0.039 | 0.07 |
| | at 80° C. in water | 0.069 | 0.015 | 0.040 | 0.045 | 0.067 | 0.047 | 0.061 | 0.0014 | 0.109 | 0.15 |
| Methanol permeation rate | 5M | 1.2 | 0.14 | 0.26 | 0.54 | 1.8 | 1.0 | 0.79 | 0.04 | 3.4 | — |
| | 10M | 4.0 | 0.40 | 1.40 | 1.6 | 5.5 | 3.78 | 2.31 | 0.18 | 9.0 | — |
| Area swelling rate (%) | | 13 | 4 | 6 | 7 | 14 | 6 | 10 | 1.5 | — | — |
| Power generation characteristic | Film thickness | 30 μm | 14 μm | 16 μm | 21 μm | 32 μm | 28 μm | 25 μm | 14 μm | 35 μm | 35 μm |
| | 5M | 0.25 V | 0.22 V | 0.24 V | 0.26 V | 0.26 V | 0.23 | 0.25 V | 0.08 V | 0.24 V | 0.25 V |
| | 8M | 0.22 V | 0.19 V | 0.22 V | 0.24 V | 0.20 V | 0.22 | 0.21 V | 0.06 V | 0.12 V | 0.11 V |

Comparative Example 6

About a Nafion 117 (registered trade name) (manufactured by Du Pont) film, the same evaluation as in Example 5 was made. The IEC obtained by the titration was 0.88 meq/g. The power generation was evaluated. As a result, the voltage at a current density of 0.05 A/cm2 was 0.19 V in the case of the 5 M methanol aqueous solution, and was 0.07 V in the case of the 8 M methanol aqueous solution.

Example 7

The following were weighed and put into a polymerizing vessel: 1.830 g ($6.575 \times 10^{-3}$ mol) of 3,3',4,4'-tetraminodiphenylsulfone, 1.084 g ($4.405 \times 10^{-3}$ mol) of 3,5-dicarboxyphenylphosphonic acid, 0.360 g ($2.170 \times 10^{-3}$ mol) of terephthalic acid, 20.5 g of polyphosphoric acid (content by percentage of phosphorus pentaoxide: 75%), and 16.5 g of phosphorus pentaoxide. Nitrogen was caused to flow therein. While the solution was slowly stirred on an oil bath, the temperature was raised to 100° C. The temperature was kept at 100° C. for 1 hour. The temperature was then raised to 150° C., and the monomers were polymerized for 1 hour. The temperature was then raised to 200° C., and the polymerization was continued for 7 hours. After the end of the polymerization, the system was naturally cooled, and then water was added thereto so as to take out the polymer. A mixer for home use was used to repeat water washing until the solution turned into neutrality in accordance with a pH test paper. The resultant polymer was dried under reduced pressure at 80° C. all night. The logarithm viscosity of the polymer measured by use of sulfuric acid was 1.07.

Into 5 mL of NMP was dissolved 1 g of the polymer, and the solution was mixed with the polymer solution in Example 5 to prepare a homogeneous solution. A blend film having an average thickness of 50 μm was then formed in the same film-forming method as in Example 5. The IEC of the film obtained by the titration was 0.98 meq/g. The 5 M methanol permeation rate was 1.0 mmol/m²·sec., and the 10 M methanol permeation rate was 3.78 mmol/m²·sec.

A film having an average thickness of 28 μm was formed and the power generation was evaluated in the same way as described above except that the cast thickness was changed. As a result, the voltage at a current density of 0.05 A/cm² was 0.23 V in the case of the 5 M methanol aqueous solution, and was 0.22 V in the case of the 8 M methanol aqueous solution.

Example 8

Into 200 mL of dichloroethane were dissolved 1.53 g (0.00620 mol) of 4-phenoxybiphenyl, 1.96 g (0.01153 mol) of diphenyl ether, and 3.60 g (0.01773 mol) of chloride isophthalate, and then the solution was cooled in an ice bath. Thereafter, 6.15 g (0.0461 mol) of aluminum chloride was added thereto. After the solution was stirred for 1 hour, the ice bath was removed, and further the polymerization was continued at room temperature for 17 hours. The reactant was poured into methanol to take out the polymer. The polymer was washed with diluted hydrochloric acid, and subsequently the polymer was repeatedly washed with hot water, and then dried. The yield was 4.92 g. The logarithm viscosity measured in concentrated sulfuric acid was 1.47. Into 20 mL of concentrated sulfuric acid was dissolved 1 g of the polymer, and the solution was heated to 65° C. and stirred for 9 hours. The polymer solution was poured into water to collect the polymer. The polymer was repeatedly washed with water until the washed solution turned into neutrality, and then dried. The yield of the resultant sulfonated polymer was 1.1 g. Into 2.5 mL of NMP was dissolved 500 mg of the sulfonated polymer at room temperature while the solution was stirred. The solution was cast onto a glass plate on a hot plate to give a thickness of 200 μm. The solvent was distilled off and then the resultant was immersed in water to yield a film. The film was immersed in 100° C. diluted sulfuric acid for 1 hour, and further immersed in 100° C. pure water for 1 hour. The resultant film had an average thickness of 50 μm. The ion exchange capacity was 0.97 meq/g. The proton conductivity of the present film was measured. The value at 80° C. and 95% RH was 0.029 S/cm, and that at 25° C. in water was 0.018 S/cm. The proton conductivity at 80° C. in water was 0.061 S/cm. The 5 M methanol permeation rate was 0.79 mmol/m²·sec., and the 10 M methanol permeation rate was 2.31 mmol/m²·sec.

A film having an average thickness of 25 μm was formed and the power generation thereof was evaluated in the same way as described above except that the cast thickness was changed. As a result, the voltage at a current density of 0.05 A/cm² was 0.25 V in the case of the 5 M methanol aqueous solution, and was 0.21 V in the case of the 8 M methanol aqueous solution.

Comparative Example 7

A polymer was synthesized and evaluated in the same way as in Example 8 except that the mol ratio of 4-phenoxybiphenyl to diphenyl ether was set to 25/75. The logarithm viscosity of the polymer measured in concentrated sulfuric acid was 2.33. The formed film had an average thickness of 50 μm. The ion exchange capacity was 1.59 meq/g. The proton conductivity at 80° C. and 95% RH was 0.14 S/cm, and that at 25° C. in water was 0.07 S/cm. The proton conductivity at 80° C. in water was 0.15 S/cm.

A film having an average thickness of 35 μm was formed and the power generation was evaluated in the same way as described above except that the cast thickness was changed. As a result, the voltage at a current density of 0.05 A/cm² was 0.25 V in the case of the 5 M methanol aqueous solution, and was 0.11 V in the case of the 8 M methanol aqueous solution.

INDUSTRIAL APPLICABILITY

The aromatic hydrocarbon polymer based proton exchange membrane of the invention can be used in a fuel cell wherein hydrogen or methanol was used as a fuel, or in a water electrolyzer, and is expected to be used as an electrolyte for various cells, a display element, a sensor, a binder, an additive or the like. The aromatic hydrocarbon polymer based proton exchange membrane gives an excellent power generation characteristic to a direct methanol fuel cell wherein high-concentration methanol is used, so as to realize a high energy density and a reduction in the size.

The invention claimed is:
1. A direct methanol fuel cell comprising an aromatic hydrocarbon based proton exchange membrane,
   wherein a methanol aqueous solution having a concentration of 25% or more by mass is used as a fuel,
   wherein the aromatic hydrocarbon based proton exchange membrane comprises an aromatic hydrocarbon based polymer,
   wherein the area swelling rate for a 30% by mass methanol aqueous solution at 40° C. is in the range from 2 to 30%, and
   wherein said aromatic hydrocarbon based polymer comprises one or more constituents represented by the following general formula (1) and/or general formula (2):

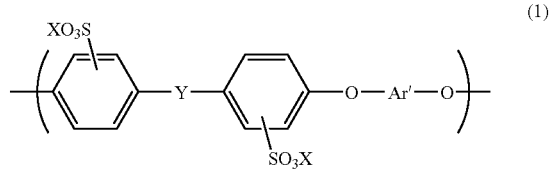

(1)

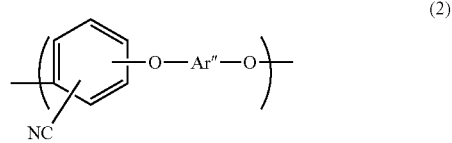

(2)

wherein Y represents a sulfone group, or a ketone group, X represents H or a monovalent cationic species, and Ar' and Ar" each represent a bivalent aromatic group which may contain a substituent.

2. A direct methanol fuel cell comprising an aromatic hydrocarbon based proton exchange membrane,
   wherein a methanol aqueous solution having a concentration of 25% or more by mass is used as a fuel,
   wherein the aromatic hydrocarbon based proton exchange membrane comprises an aromatic hydrocarbon based polymer, wherein the ion exchange capacity is in the range from 0.6 to 1.3 meq/g, and
   wherein said aromatic hydrocarbon based polymer comprises one or more constituents represented by the following general formula (1) and/or general formula (2):

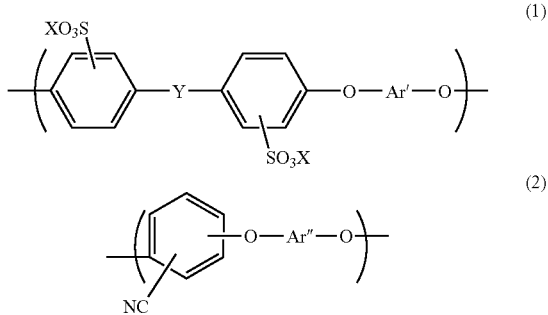

wherein Y represents a sulfone group, or a ketone group, X represents H or a monovalent cationic species, and Ar' and Ar" each represent a bivalent aromatic group which may contain a substituent.

3. The direct methanol fuel cell according to claim 1, wherein the ion exchange capacity is in the range from 0.6 to 1.3 meq/g.

4. The direct methanol fuel cell according to claim 1, wherein the value of the proton conductivity measured in water at 80° C. is not less than 3 times as large as the value of the proton conductivity measured in water at 25° C.

5. The direct methanol fuel cell according to claim 1, wherein the average film thickness is in the range from 5 to 35 μm.

6. The direct methanol fuel cell according to claim 1, wherein the cell temperature is set to 35° C. or higher.

7. The direct methanol fuel cell according to claim 2, wherein the value of the proton conductivity measured in water at 80° C. is not less than 3 times as large as the value of the proton conductivity measured in water at 25° C.

8. The direct methanol fuel cell according to claim 3, wherein the value of the proton conductivity measured in water at 80° C. is not less than 3 times as large as the value of the proton conductivity measured in water at 25° C.

9. The direct methanol fuel cell according to claim 2, wherein the average film thickness is in the range from 5 to 35 μm.

10. The direct methanol fuel cell according to claim 3, wherein the average film thickness is in the range from 5 to 35 μm.

\* \* \* \* \*